United States Patent [19]
Irie et al.

[11] Patent Number: 6,163,334
[45] Date of Patent: Dec. 19, 2000

[54] IMAGE FORMING DEVICE

[75] Inventors: Kazumi Irie; Kazuyuki Ohnishi, both of Yamatokoriyama; Yoichi Shimazawa, Nara; Syoichiro Yoshiura, Tenri, all of Japan

[73] Assignee: Sharp Kabushiki Kaisha, Osaka, Japan

[21] Appl. No.: 09/183,022

[22] Filed: Oct. 30, 1998

[30] Foreign Application Priority Data

Oct. 31, 1997 [JP] Japan .................................. 9-301201

[51] Int. Cl.⁷ .............................. B41J 2/435; B41J 2/47
[52] U.S. Cl. .......................................... 347/249; 347/232
[58] Field of Search ................................... 347/234, 235, 347/249, 247, 143, 144, 196, 250, 248, 116, 118, 232; 346/106, 98

[56] References Cited

U.S. PATENT DOCUMENTS

| | | | |
|---|---|---|---|
| 4,903,067 | 2/1990 | Murayama et al. | 346/160 |
| 5,115,256 | 5/1992 | Miyagi et al. | 346/106 |
| 5,943,087 | 8/1999 | Kataoka et al. | 347/250 |
| 6,002,413 | 12/1999 | Nishizawa et al. | 347/116 |
| 6,003,972 | 12/1999 | Narushima et al. | 347/43 |

FOREIGN PATENT DOCUMENTS

| | | |
|---|---|---|
| 63-064473 | 3/1988 | Japan . |
| 63-191170 | 8/1988 | Japan . |
| 1-200775 | 8/1989 | Japan . |
| 02018517 | 1/1990 | Japan . |

*Primary Examiner*—N. Le
*Assistant Examiner*—K. Feggins
*Attorney, Agent, or Firm*—Dike, Bronstein, Roberts & Cushman, LLP; David G. Conlin; David A. Tucker

[57] ABSTRACT

A conventional image forming device having a plurality of image optical scanning recording sections has had a drawback of being incapable of correcting printing positions of the image optical scanning recording sections with high precision by using a small-scale circuit. In the case of an image forming device of the present invention, a variable clock generator 114 having a voltage control oscillator (VCO) 114a is provided therein as reference clock signal generating means of laser control system of each of image optical scanning recording sections (LSU) for cyan, yellow, and magenta. By so doing, during an invalid printing period prior to a valid printing period, frequencies of the reference clock signals of the LSUs for cyan, yellow, and magenta are adjusted in accordance with offsets of printing start positions of these LSUs with respect to that of the LSU for black, so that printing offsets are eliminated. As a result, the printing start positions are made to coincide with each other with high precision even with a small-scale circuit.

24 Claims, 16 Drawing Sheets

IMAGE FORMING DEVICE

FIELD OF THE INVENTION

The present invention relates to an image forming device such as a copying machine, a printer, or a facsimile machine, and particularly relates to a device equipped with a plurality of image forming stations for outputting images, a typical example of which is a tandem-type color image forming device.

BACKGROUND OF THE INVENTION

In a digital color image forming device, it is general to use three color materials of yellow (Y), magenta (M), and cyan (C), or four color materials of the foregoing three and black. Furthermore, a technique of using more than four color materials is recently often used to obtain good image quality.

In the case where an image is formed with color materials of many colors, a full-color image in a good state can be obtained by precisely adjusting respective printed quantities of the color materials used. Therefore, mixing of the color materials before printing leads to serious deterioration in image quality, and to prevent this problem, it is usual to prepare an equal number of image forming stations to the number of the color materials.

Furthermore, since a change in relative color material printed positions leads to a change in superimposition of the printed color materials, a color resulting on the superimposition of the color materials is sometimes recognized by human eyes as different from a color resulting on the superimposition of the same quantities of the same color materials. Therefore, by precisely adjusting relative positions of the image forming stations, and further, by maintaining the adjusted positions without changes as time elapses, it is possible to stably maintain the relative color material printed positions at all times. Thus, keys to high image quality are to precisely adjust printed quantities of the color materials and to improve precision in positioning the image forming stations.

Resolution of an image forming device such as a copying machine or a printer of these days is at least about 400 dpi (dots/inch), and sometimes about 600 dpi in the case of a device with high resolution. Incidentally, if a device has a resolution of 300 dpi, a size of each pixel of the device is about 85 $\mu$m.

For example, assume that it is requested to form on paper one line extending in a proceeding direction of paper (sub scanning direction) (hereinafter referred to as a vertical line) by using an image forming device wherein two image forming stations are juxtaposed in the paper proceeding direction and an image is formed by use of the two image forming stations. If relative positions of the image forming stations do not agree but differ by one pixel in a direction crossing the paper proceeding direction (main scanning direction), not one but two vertical lines are outputted. This is far from high image quality. Even if the position difference between the image forming stations is suppressed to ½ pixel, not one line but 1.5 line is obtained, and this is also far from high image quality.

In each image forming station as well, inappropriate relative positions of an image optical scanning recording section and a photosensitive body lead to the following drawbacks; in the case where a space between the image optical scanning recording section and the photosensitive body is too wide, an image which is expanded in the main scanning direction is outputted; and in the case where the space therebetween is too narrow, an image which is reduced in the main scanning direction is outputted.

Therefore, clear from the foregoing description, the precision in positioning the image forming stations and the image quality are closely related, and mechanical precision in $\mu$m order is required to achieve high image quality.

It is, however, difficult to achieve the position precision in Am order with the current mechanical techniques, and even if it is possible, it costs extremely high. Furthermore, considering that this has to be maintained for a long time (life time of a product is 3 to 5 year in average) and taking environmental changes into consideration, it is almost impossible.

As an arrangement with which the foregoing problem is solved, the Japanese Publication for Laid-Open Patent Application No. 64473/1988 (Tokukaisho 63-64473) and the Japanese Publication for Laid-Open Patent Application No. 191170/1988 (Tokukaisho 63-191170) disclose an arrangement wherein each image optical scanning recording section in each image forming station is made to have a plurality of reference clock signals differing in frequency and phase, and the most suitable reference clock signal is selected and used from among the prepared reference clocks, so that a mechanical offset is eliminated.

According to the arrangement disclosed by the foregoing publications, however, many reference clock signals have to be prepared so as to cancel the mechanical offset. In other words, the precision in cancelling the mechanical offset is proportional to the number of the prepared reference clock signals. As higher image quality is demanded, the circuit scale expands while the circuit structure becomes more complicated. Besides, stepless adjustment of the offset requires an infinite number of reference clock signals, which is practically impossible. Therefore, precision in correction is only achieved to some extent since the circuit scale is limited.

SUMMARY OF THE INVENTION

The object of the present invention is to provide an image forming device having a system for electrical stepless correction relating to mechanical offset, which therefore requires less strict mechanical positioning precision and ensures high image quality though having a simple structure.

To achieve the above object, an image forming device of the present invention comprises a plurality of image optical scanning recording sections, each of which starts image recording by line scanning in accordance with an image signal when the number of clocks of a reference clock signal counted in synchronization with a line scanning synchronizing signal reaches a predetermined number, wherein at least one of the image optical scanning recording sections has frequency varying means for varying a frequency of the reference clock signal thereof, and the image forming device further comprises control means for controlling the frequency varying means so as to adjust the frequency of the reference clock signal based on an offset of an image recording start position of the image optical scanning recording section in a main scanning direction crossing a proceeding direction of a transfer material so that the image recording start position coincide with an image recording start position of the other image optical scanning recording section.

With the aforementioned arrangement, it is possible to change the frequency of the reference clock signal of the image optical scanning recording section to a desired frequency. The control means uses frequency varying means to adjust the frequency of the reference clock signal so that the offset of the image recording start position of the image optical scanning recording section with respect to another image recording start position of the other image optical scanning recording section is eliminated. By so doing, the offset between the image recording start positions can be eliminated.

In this case, by providing the frequency varying means, stepless adjustment of the frequency is enabled. Therefore, correction with higher precision with a smaller-scale circuit can be performed, as compared with the conventional case where a plurality of reference clock signals are prepared and are switched in accordance with the offset.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

The following description will explain an embodiment of the present invention while referring to FIGS. 1 through 14.

Figure 2:
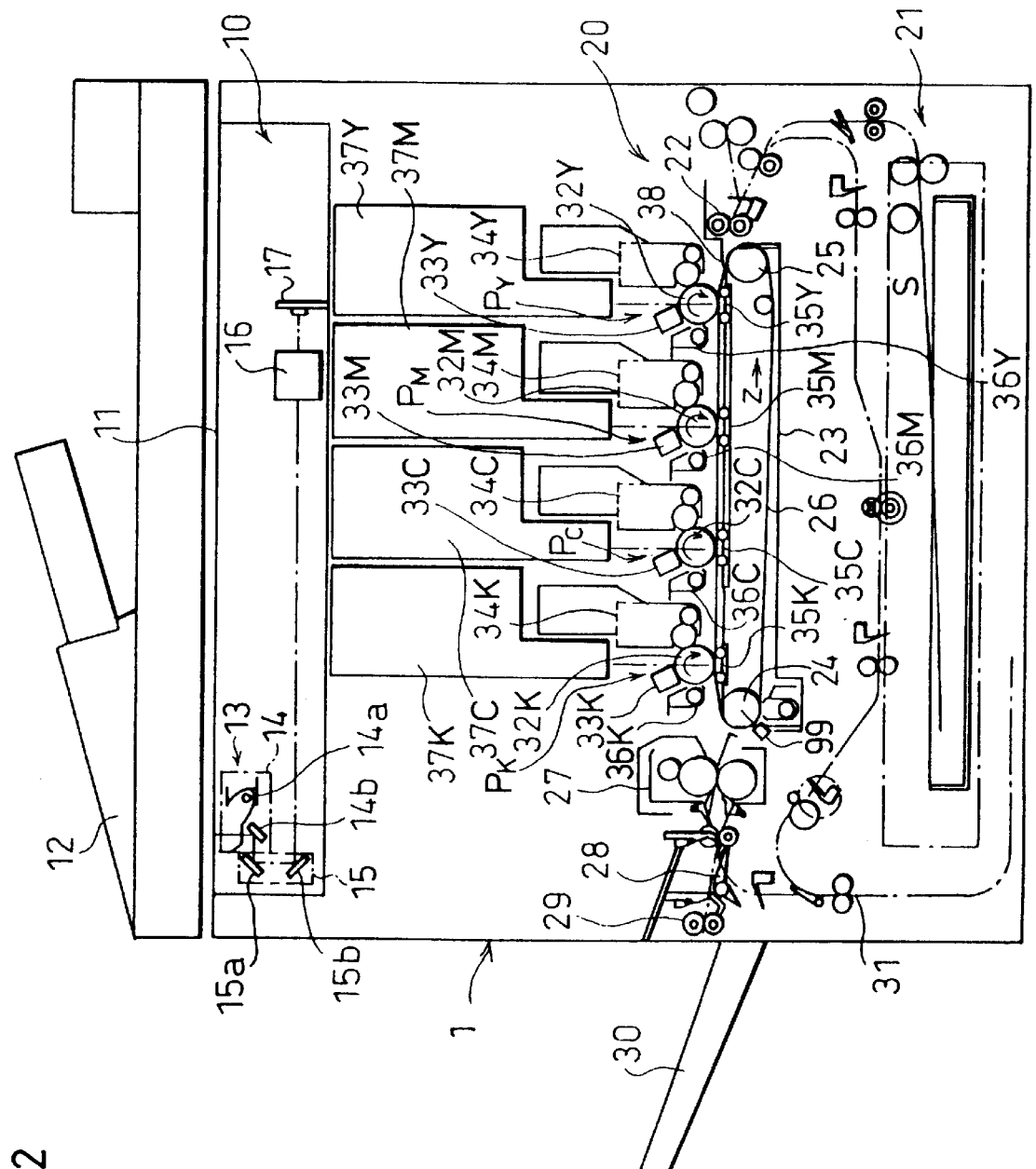
FIG. 2 is a view of a total arrangement of the digital color copying machine.

A digital color copying machine as a color image forming device in accordance with the present embodiment is arranged as shown in FIG. 2. Namely, on a surface of a main body 1 of the copying machine, a document platen 11 and an operational panel 60 (see FIG. 5) which will be described later are provided, while inside the main body 1 of the copying machine, an image reading unit 10 and an image forming unit 20 are installed.

An automatic document feeder 12 is provided on an upper surface of the document platen 11, so as to freely cover and uncover the document platen 11 and so that the automatic document feeder 12 has a predetermined position relationship with the upper surface of the document platen 11.

The automatic document feeder 12 is a recirculating automatic document feeder (RADF) applicable to two-sided documents. The automatic document feeder 12 feeds documents so that one side of each sheet of documents faces the image reading unit 10 at a predetermined position on the document platen 11, while after image reading with respect to the foregoing side finishes, the sheet is reversed and is transported to the document platen 11 so that the other sheet faces the image reading unit 10 at the predetermined position on the document platen 11. Then, after image reading finishes with respect to both the sides of the sheet, the sheet is discharged, and the recirculating feeding operation is performed with respect to the next sheet. The aforementioned document transporting and reversing operations are controlled in association with the operation of the digital color copying machine as a whole.

The image reading unit 10 is provided below the document platen 11 so as to read an image of the document transported to the document platen 11 by the automatic document feeder 12. In the image reading unit 10, there are provided a document scanning body 13 which reciprocally moves along a lower surface of the document platen 11 in parallel thereto, an optical lens 16, and a CCD (charge coupled device) line sensor 17.

The document scanning body 13 is composed of a first scanning unit 14 and a second scanning unit 15. The first scanning unit 14 has an irradiating lamp 14a for irradiating an image surface of the document and a first mirror 14b for deflecting reflected light image from the document in a predetermined direction. The first scanning unit 14 reciprocally moves at a predetermined scanning speed, maintaining a predetermined gap from the lower surface of the document platen 11 so as to be parallel with the document platen 11. The second scanning unit 15 has a second mirror 15a and a third mirror 15b for further deflecting, in a predetermined direction, the reflected light image from the document which has been deflected by the first mirror 14b of the first scanning unit 14. The second scanning unit 15 reciprocally moves in parallel, maintaining constant speed relationship with the first scanning unit 14.

The reflected light image from the document, which has been deflected by the third mirror 15b of the second scanning unit 15, is converged by the optical lens 16, and an optical image is formed at a predetermined position. The formed optical image is sequentially subjected to photoelectric conversion by the 3-line CCD line sensor 17 which is a photoelectric converting element, and as a result, an electric signal is outputted. The original image information thus converted to the electric signal by the CCD line sensor 17 is transferred to an image processing unit which will be described later, where a predetermined processing is applied to the original image information as image data.

The following description will explain the image forming unit 20 of the copying machine main body 1.

At a bottom part of the image forming unit 20, there is provided a feeding system 21 which feeds sheets S of paper one by one from a sheet tray storing the sheets S toward an image optical scanning recording section side. Timings of transporting the sheets S thus fed one by one are controlled by a pair of register rollers 22 provided before the image forming unit 20. Further, in the case of two-sided copy, the sheet S whose surface on one side has been subject to copying is turned over and thereafter supplied again to the image optical scanning recording section in a manner matched with the operation of the image optical scanning recording section.

Above the feeding system 21 of the image forming unit 20, there is provided a transfer transporting belt system 23. The transfer transporting belt system 23 is composed of a plurality of rollers such as a driving roller 24 and a driven roller 25, as well as a transfer transporting belt 26 which is stretched around the driving roller 24 and the driven roller 25 so that an upper portion and a lower portion of the transfer transporting belt 26 are substantially parallel. The transfer transporting belt system 23 transports the sheet S by causing the sheet S to electrostatically adhere to the transfer transporting belt 26.

On a downstream side to the transfer transporting belt system 23, there is provided a fixing device 27 for fixing a toner image formed as a result of transfer onto the sheet S. After passing a fixing roller nip of the fixing device 27, the sheet S is transported through a transport direction switching gate 28, and thereafter discharged by a discharge roller 29 onto a discharge tray 30 which is disposed on an outer wall of the copying machine main body 1.

Incidentally, the switching gate 28 is a member for selectively switching a sheet transporting route of the sheet S after being subject to the fixing operation, either in such a direction as to discharge the sheet S outside the copying machine main body 1 or in such a direction as to re-supply the sheet S to the image forming unit 20. In the case where the transporting route is switched by the switching gate 28 in the direction toward the image forming unit 20, the sheet S is re-supplied to the image forming unit 20 after the sheet S is turned up side down while transported through a switch back transporting route 31.

On the other hand, first, second, third, and fourth image forming stations $P_Y$, $P_M$, $P_C$, and $P_K$ are juxtaposed above and close to the transfer transporting belt 26 in the image forming unit 20. They are provided in this order from the upstream side of the sheet transporting route.

The transfer transporting belt 26 is driven by friction by the driving roller 24, in a direction indicated by an arrow Z in the figure, so as to catch the sheet S which is supplied thereto by the feeding system 21 as described above, and to transport the sheet S to the image forming stations $P_Y$, $P_M$, $P_C$, and $P_K$ sequentially.

The image forming stations $P_Y$, $P_M$, $P_C$, and $P_K$ have substantially the same structure, and include photosensitive drums 32Y, 32M, 32C, and 32K, respectively, which are driven so as to rotate in arrow directions shown in the figure, respectively. In the vicinity of the photosensitive drums 32Y, 32M, 32C, and 32K, there are respectively provided : chargers 33Y, 33M, 33C, and 33K; developing devices 34Y, 34M, 34C, and 34K; transfer dischargers 35Y, 35M, 35C, and 35K; and cleaning devices 36Y, 36M, 36C, and 36K. In the vicinity of each photosensitive drum, the charger, the developing device, the transfer discharger, and the cleaning device are positioned in this order in a rotational direction of the photosensitive drum. The chargers 33Y, 33M, 33C, and 33K uniformly charge the photosensitive drums 32Y, 32M, 32C, and 32K, respectively. The developing devices 34Y, 34M, 34C, and 34K develop electrostatic latent images formed on the photosensitive drums 32Y, 32M, 32C, and 32K, respectively. The transfer discharger 35Y, 35M, 35C, and 35K transfer toner images thus obtained by the development onto the sheet S. The cleaning devices 36Y, 36M, 36C, and 36K remove toner remaining on the photosensitive drums 32Y, 32M, 32C, and 32K, respectively.

Above the photosensitive drums 32Y, 32M, 32C, and 32K, there are provided laser beam scanner units (hereinafter referred to as LSUs) 37Y, 37M, 37C, and 37K, respectively, each of which is an image optical scanning recording section for emitting dot lights which are modulated in accordance with the image data.

A pixel signal corresponding to a yellow component image of a color original image is supplied to the LSU 37Y, an image signal corresponding to a magenta component image thereof to the LSU 37M, a pixel signal corresponding to a cyan component image thereof to the LSU 37C, and a pixel signal corresponding to a black component image thereof to the LSU 37K.

By so doing, electrostatic latent images respectively corresponding to color component images of the original image information are formed on the photosensitive drums 32Y, 32M, 32C, and 32K of the image forming stations, respectively. Since toner of yellow color, toner of magenta color, toner of cyan color, and toner of black color are stored in the developing devices 34Y, 34M, 34C, and 34K of the image forming stations, respectively, the original image information which has been converted to the respective color component images at the respective image forming stations are revisualized as toner images of the respective colors.

Incidentally, detailed arrangements of the LSUs 37Y, 37M, 37C, and 37K will be described later along with characteristics of the present embodiment.

Further, between the first image forming station $P_Y$ and the feeding system 21, a sheet attraction charger 38 composed of a brush is provided, with which a surface of the transfer transporting belt 26 is charged. With this arrangement, the sheet S supplied by the feeding system 21 is transported from the first image forming station $P_Y$ to the fourth image forming station $P_K$ without coming off, since being surely attracted onto the transfer transporting belt 26.

On the other hand, substantially right above the driving roller 24 positioned between the fourth image forming station $P_K$ and the fixing device 27, there is provided a charge removing discharger which is not shown. An alternate current for separating the sheet S adhering to the transfer transporting belt 26 therefrom is applied to the charge removing discharger.

Furthermore, a reading sensor 99 which is used in an image position correcting operation which will be described later is provided in the vicinity of the charge removing discharger, so as to face the driving roller 24. The reading sensor 99 is provided for reading a checked pattern image (checked pattern) formed on the sheet S transported by the transfer transporting belt 26. Here, the reading sensor 99 is composed of a CCD.

In the digital color copying machine as arranged above, a cut sheet is used as the sheet S. When the sheet S is sent out from the sheet tray into a guide of the sheet transporting route of the feeder system 21, an end portion of the sheet S is detected by a sensor not shown, and in response to a detection signal outputted from the sensor, the sheet is temporarily stopped by the resister rollers 22.

In the case of the color copy mode, the sheet is transported to the transfer transporting belt 26 at a timing synchronized with operations of the image forming stations $P_Y$, $P_M$, $P_C$, and $P_K$. In the case of the monochromatic copy mode, the sheet is transported at a timing synchronization with only the operation of the fourth image forming station $P_K$. Here, since the transfer transporting belt 26 is charged to a predetermined potential by the sheet attraction charger 38, stable transportation of the sheet is achieved while the sheet is transported through the image forming stations $P_Y$, $P_M$, $P_C$, and $P_K$.

In the case of the color copy mode, toner images are formed in respective colors at the image forming stations $P_Y$, $P_M$, $P_C$, and $P_K$, and the toner images are superimposed on a surface of the sheet S which is transported by the transfer transporting belt 26 while electrostatically attracting thereto. When the transfer of the toner image by the fourth image forming station $P_K$ is perfected, separation of the sheet S from the transfer transporting belt 26 is caused from a front end portion of the sheet S by the charge removing discharger, and the sheet S is guided to the fixing device 27. Finally, the sheet S on which the toner images are fixed is discharged from a transfer material outlet onto the discharge tray 30.

On the other hand, in the case of the monochromatic copy mode, only a toner image of black color is formed in the fourth image forming station $P_K$. The toner image is transferred on the surface of the sheet S which is transported by the transfer transporting belt 26 while electrostatically adhering thereto. After the toner image is fixed on the sheet S in the same manner as described above, the sheet S is discharged.

Figure 3:
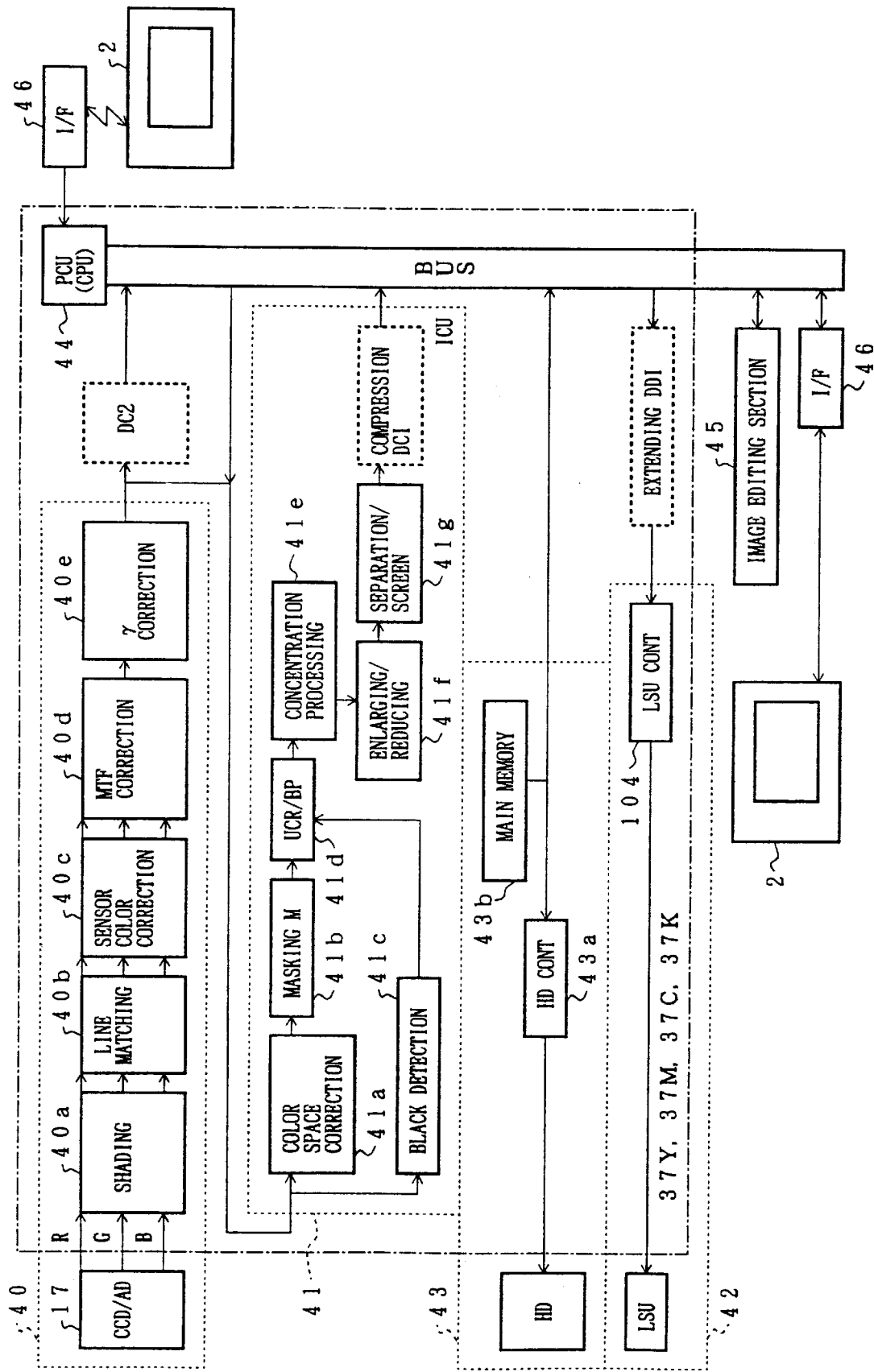
FIG. 3 is a block diagram illustrating a circuit arrangement of an image processing unit installed in the digital color copying machine.

The following description will explain arrangement and function of the image processing unit for processing color image information, which is installed in the digital color copying machine, while referring to FIG. 3.

As shown in FIG. 3, the image processing unit has an image data input section 40, an image data processing section (ICU: image control unit) 41, an image data output section 42, an image memory 43, a print control unit (hereinafter referred to as PCU) 44, an image editing section 45, and an outside interface section (I/F) 46.

The image data input section 40 is composed of: the 3-line CCD line censor 17 (see FIG. 2) which is capable of reading the color original image and outputting line data as a result of color decomposition of the color original image into color components of YMC (yellow, magenta, and cyan); shading correcting circuit 40a for correcting line image levels of the line data thus read by the CCD line sensor 17; line matching section 40b, which is a line buffer or the like, for canceling offset of the image line data thus read by the CCD line sensor 17; a sensor color correcting section 40c for correcting color data of line data of respective colors outputted from the CCD line sensor 17; an MTF (modulation transfer function) correcting section 40d for correcting signals supplied to pixels so that changes of the signals become clearer; and a γ correcting section 40e for correcting brightness of an image for visibility correction.

The image data processing unit 41 is composed of: a color space correcting circuit 41a for, as described later, correcting a color reproduction region of a color image signal supplied thereto through the outside interface section 46 to a color reproduction region of the color toner in the image forming unit 20; a masking circuit 41b for converting RGB (red, green, blue) signals of the inputted image data into YMC signals for the image forming stations $P_Y$, $P_M$, $P_C$, and $P_K$ of the image forming unit 20; a black detecting circuit 41c for detecting a black component from the RGB signals of a color image which is supplied through the image data input section 40 or the outside interface section 46 as will be described later; an under color removal/black plus circuit (UCR/BP) 41d for performing under color removal by detecting black according to the YMC signals outputted from the masking circuit 41b and for adding the black component signal outputted from the black detecting circuit 41c; concentration adjusting circuit 41e for adjusting concentration of the color image data in accordance with a concentration converting table; an enlargement processing circuit 41f for enlarging/reducing the inputted image information in accordance with a set scale of enlargement; and a separation/screen circuit 41g for detecting character regions, photograph regions, and halftone dot regions of the image information from the input image data for separation of regions, and for determining an output pattern of an image.

The image data output section 42 is composed of: a laser control unit (LSU CONT) 104 for performing pulse width modulation in accordance with the image data of the respective colors; and the LSUs 37Y, 37M, 37C, and 37K for the respectively colors, for performing laser recording in accordance with the pulse width modulation signals in accordance with the image signals of the respective colors outputted from the laser control unit 104 (see FIG. 2).

The image memory 43 is composed of: a main memory 43b which is composed of, for example, a RAM (random access memory) such as a semiconductor memory; four hard disks (HD) 43Y, 43M, 43C, and 43K each of which is composed of a rotatable recording medium; a hard disk control unit (HD CONT) 43a for controlling the hard disks 43Y, 43M, 43C, and 43K. The hard disks 43Y, 43M, 43C, and 43K are provided for storing image data for the respective four colors, which are 8-bit data for each color, so that the image data are separately stored according to the colors.

The hard disk control unit 43a sequentially receives 8-bit image data for each of the four colors (32 bits in total) which are serially outputted from the image data processing unit 41. Temporarily storing the received image data in a buffer, the hard disk control unit 43a converts the 32-bit data to 8-bit image data of each color, and outputs the four sets of 8-bit image data thus obtained to the hard disks 43Y, 43M, 43C, and 43K in parallel so that the four hard disks individually control the four sets of image data, respectively.

The PCU 44 controls the image data input section 40, the image data processing section 41, the image data output section 42, the image memory 43, the image editing section 45 which will be described later, and the outside interface section 46, according to a predetermined sequence, as well as controls the whole digital color copying machine. The PCU 44 is composed of a CPU (central processing unit).

The image editing section 45 is provided for applying a predetermined image editing operation with respect to the image data which are temporarily stored in the image memory 43 after being supplied thereto through the image data input section 40, the image data processing section 41 or the outside interface section 46 as will be described later.

The outside interface section 46 is communication interface means for receiving image data from an image input processing device 2 which is provided outside separately from the digital color copying machine. Note that image data supplied through the outside interface section 46 can be also converted to data of a such level as can be dealt with by the image forming unit 20 of the digital color copying machine, by once inputting the image data into the image data processing section 41 so that color space correction and the like is applied to the image data. The image data thus converted are stored in the hard disks 43Y, 43M, 43C, and 43K.

Figure 4:
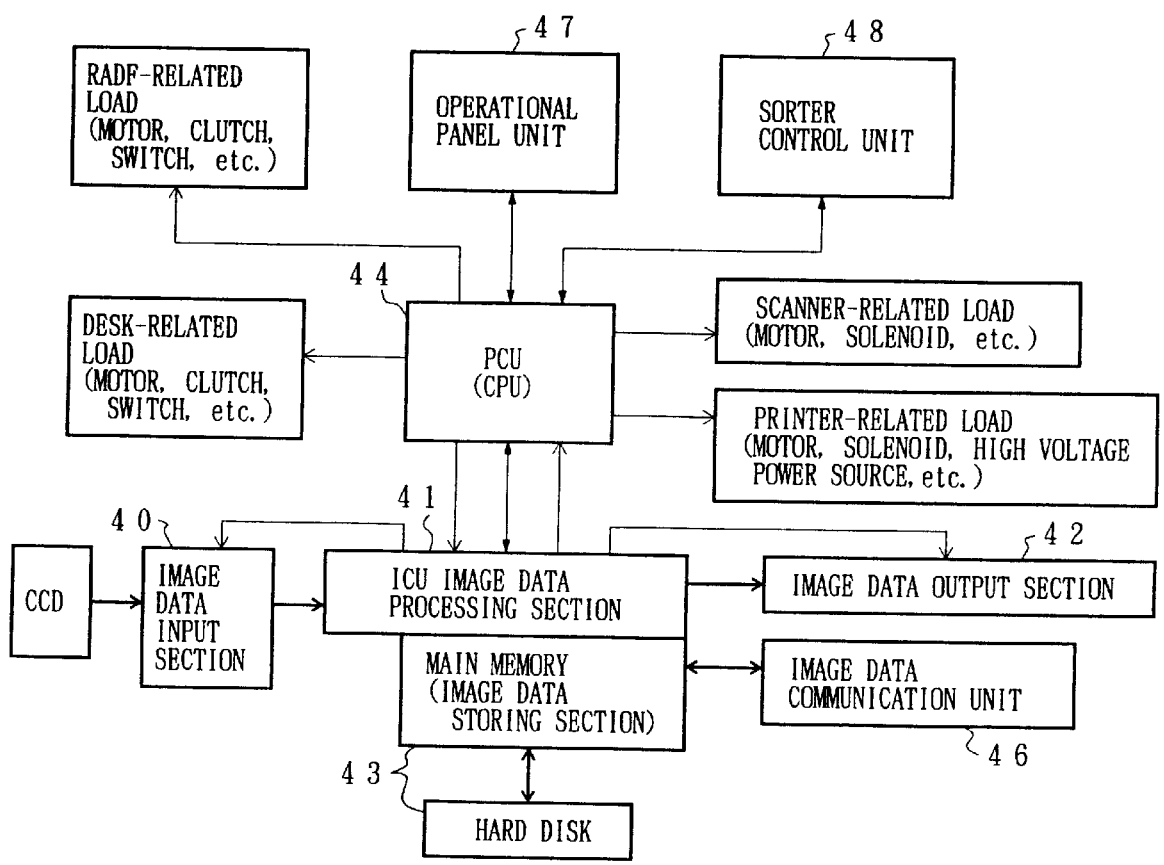
FIG. 4 is a block diagram illustrating a control system of the digital color copying machine.

On the other hand, the digital color copying machine is controlled by the PCU 44, and the control system of the PCU 44 is shown in FIG. 4.

As shown in FIG. 4, the PCU 44 is connected with desk-related loads, RADF-related loads, an operational panel unit 47, a sorter control unit 48, scanner-related loads, printer-related loads, and the image data processing section 41.

The PCU 44 controls these parts by sequence control, outputting control signals to each part when controlling the same. The desk-related loads include loads of motors, clutches, and the like of a multi-stage feeding unit and a sorter of a post-processing device which are not shown, other than the copying machine main body 1. The RADF-related loads include loads of motors, clutches, switches, and the like of the recirculating automatic document feeder (RADF) 12. The scanner-related loads include loads of motors, solenoids, and the like of the image reading unit 10. The sorter control unit 48 has a CPU, for controlling an operation of the sorter in accordance with a control signal from the PCU 44. The printer-related loads include loads of motors, solenoids, high-voltage power sources, and the like of the image forming unit 20.

Though details will be described later, in the digital color copying machine in accordance with the present embodiment, the PCU 44 controls the printer-related loads and the like so as to perform an image position correcting operation which will be described later. Thus, the PCU 44 functions as checked pattern forming means and control means in the present invention. Further, the PCU 44, together with a reading sensor 99, constitutes offset detecting means.

The operational panel unit 47 is a section with which the operator can set copy modes or the like and input various commands with respect to the digital color copying machine, and includes a CPU. The operational panel unit 47 sends the PCU 44 a control signal in accordance with, for example, a copy mode set by the operator.

In response to the control signal, the PCU 44 makes the digital color copying machine in accord with the mode thus set. Further, the PCU 44 sends a control signal indicative of an operational state of the digital color copying machine to the operational panel unit 47. To show the operator in what operational state the digital color copying machine is, the operational panel unit 47 displays the operational state based on the control signal, using a display section.

An image data communication unit is connected with the main memory 43b of the image memory 43 connected with the image data processing section 41. The image data communication unit, incorporating the aforementioned outside interface section 46, is provided for enabling communication of information such as image data and image control signals with other digital information apparatuses.

Figure 5:
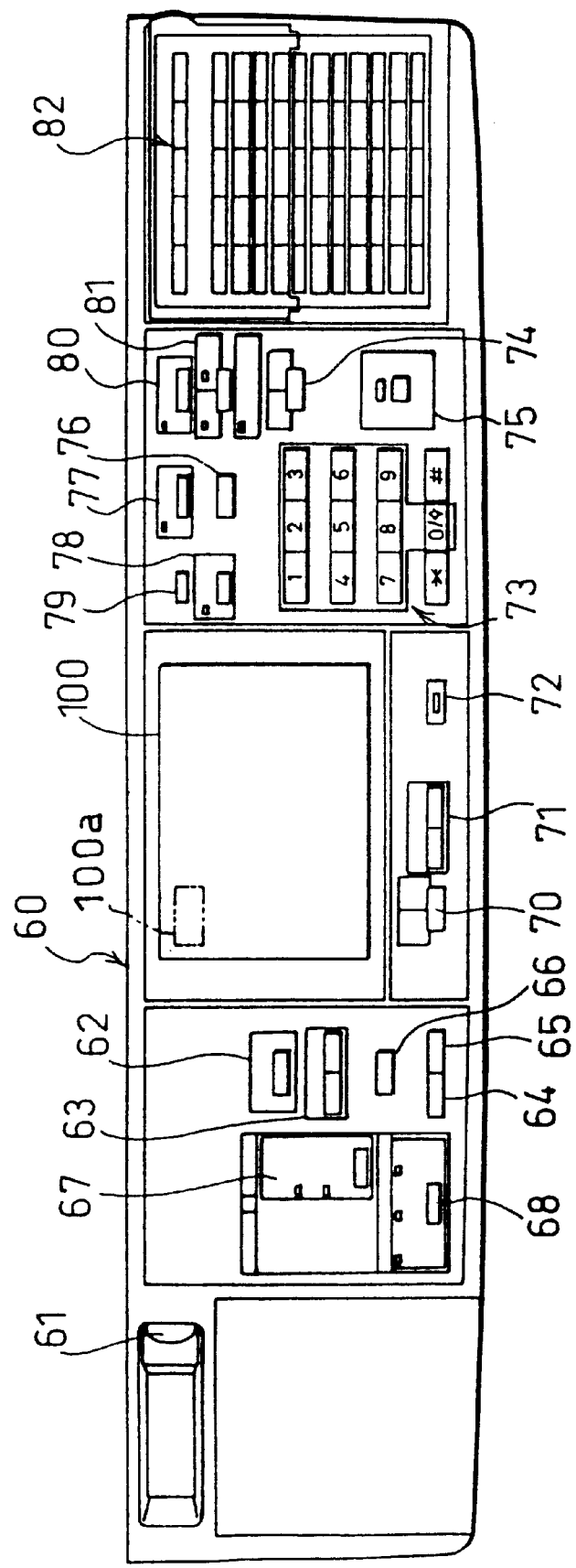
FIG. 5 is a plan view illustrating an arrangement of an operational panel of the digital color copying machine.

The operational panel unit 47 is equipped with the operational panel 60 shown in FIG. 5 as an inputting section. In the center of the operational panel 60, there is provided a liquid crystal display (LCD) device 100 which is a display section of a touch-panel type. In a part of a screen of the LCD device 100, a screen switch command pattern 100a is displayed. The screen switch command pattern 100a is provided so as to be used for inputting a command for switching the display screen of the LCD device 100 to a screen for image editing function selection. When the operator operates the screen switch command pattern 100a by directly pressing it with a finger, the editing functions are all listed up and displayed on the screen of the LCD device 100, so that the operator can selects a desired function. Then, when the operator presses a pattern indicating an editing function the operator demands among the patterns indicating various editing functions thus displayed, the editing function is set.

Further, there is provided a brightness adjusting dial 61 for adjusting brightness of the screen of the LCD device 100, at a left end of the operational panel 60 as viewed in FIG. 5. Between the dial 61 and the LCD device 100, there are provided an "automatic magnification" key 62, a "zoom" key 63, "fixed magnification" keys 64 and 65, a "life-size copy" key 66, a "two-sided copy" key 67, and a "post-processing" key 68. The "automatic magnification" key 62 is for setting a mode for automatically selecting a magnification rate. The "zoom" key 63 is for setting the magnification rate by zooming by 1% at a time. The "fixed magnification" keys 64 and 65 are for reading and selecting a fixed magnification rate, and the "life-size copy" key 66 is for resetting the magnification rate to a standard magnification rate (life size). The "two-sided copy" key 67 is for setting the two-sided copy mode, and the "post-processing" key 68 is for setting an operational mode of a post-processing unit which sorts out sheets of produced copies ejected from the digital color copying machine.

On the lower side to the LCD device 100 as viewed in FIG. 5, there are provided a "contrast switch" key 70, a "contrast control" key 71, and a "tray select" key 72 are provided.

The "contrast switch" key 70 is for switching a contrast adjustment mode between an automatic mode, a manual mode, and a photographic mode, and the "contrast control" key 71 is for minute adjustment of contrast in the manual mode or the photographic mode. The "tray select" key 72 is for selecting a sheet of paper in a desired size, among those stored in the paper feeding unit of the digital color copying machine.

Furthermore, on the right side to the LCD device 100 as viewed in FIG. 5, there are provided a "copy quantity" key 73, a "clear" key 74, a "start" key 75, a "clear all" key 76, an "interruption" key 77, an "operation guide" key 78, a "message scroll" key 79, a "memory transfer mode" key 80, a "copy/facsimile mode switch" key 81, and a "rapid dial" key 82.

The "copy quantity" key 73 is for setting the number of copies to be produced, and the "clear" key 74 is for clearing the set number of copies to be produced, or stopping a continuous copying operation by half. The "start" key 75 is for commanding commencement of a copying operation, and the "clear all" key 76 is for cancelling all the modes now set and restoring a predetermined standard state. The "interruption" key 77 is for temporarily stopping a current copying operation and allowing a copying operation of another document. The "operation guide" key 78 is used to know how to operate the digital color copying machine, and when the "operation guide" key 78 is operated, how to operate the digital color copying machine is displayed on the LCD device 100. The "message scroll" key 79 is for scrolling the message screen so that a sequel to the message displayed in response to the operation of the "operation guide" key 76 should be displayed.

The "memory transfer mode" key 80, the "copy/facsimile mode switch" key 81, and the "rapid dial" key 82 are keys concerning setups related to the facsimile mode. The "memory transfer mode" key 80 is for transferring data of a document after temporarily storing the data in the memory, and the "copy/facsimile mode select" key 81 is for switching the modes of the digital color copying machine between the copy mode and the facsimile mode. The "rapid dial" key 82 is used in the case where a telephone number of a destination is previously recorded, and just by one touch control, transmission to the destination is conducted.

Incidentally, the operation panel 60 described above and the keys deposited on the operation panel 60 are merely examples, and needless to say, the arrangement of the operation panel 60 and the keys thereon may vary depending on what functions are given to the digital color copying machine.

The following description will explain a structure of the LSUs 37Y, 37M, 37C, and 37K.

Figure 6:
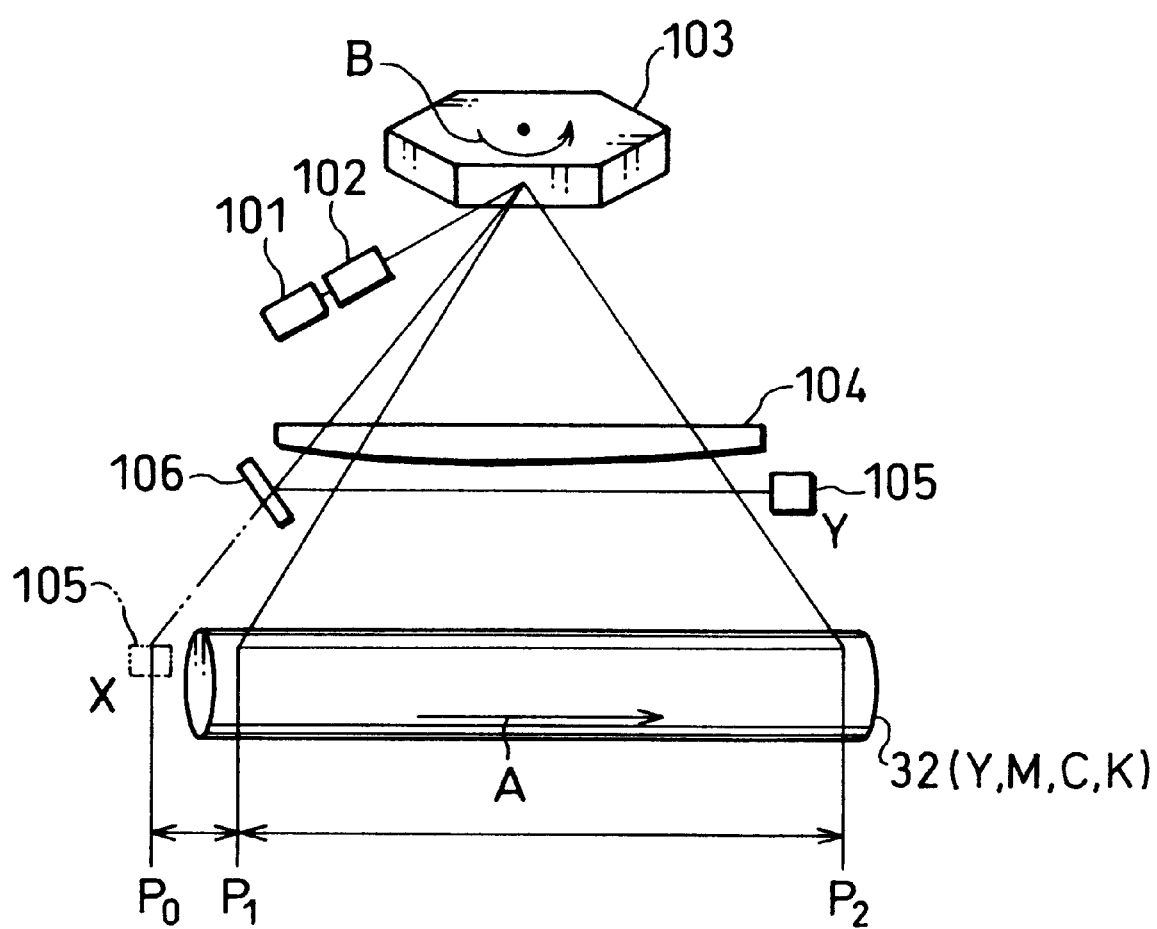
FIG. 6 is a view illustrating an arrangement of the laser beam scanner unit provided in the digital color copying machine.

Each of the LSUs 37Y, 37M, 37C, and 37K has, as shown in FIG. 6, a laser emitting section 101 composed of a semiconductor laser or the like, a collimator lens 102, a polygon mirror 103, a lens system 104 composed of an fθ lens and the like, a beam detect sensor (hereinafter referred to as BD sensor) 105, and a fixed mirror 106.

In each of the LSUs 37Y, 37M, 37C, and 37K, a laser light emitted by the laser emitting section 101 has its beam shape re-shaped by the collimator lens 102, and thereafter, the laser light is projected onto the polygon mirror 103 which rotates at a constant speed in a direction B in the figure. Here, the laser light is reflected and deflected, thereby scanning the photosensitive drums 32Y, 32M, 32C, and 32K in a direction A. The lens system 104 has a function of further deflecting the laser light which has been deflected by the polygon mirror 103, so that the laser light scans the photosensitive drums 32Y, 32M, 32C, and 32K by making a uniform linear motion.

The BD sensor 105 is a sensor (synchronizing signal generating means) for detecting the laser light at a position $P_0$ which is before a printing start position $P_1$, and outputting a BD signal which is a horizontal synchronizing signal for synchronizing scanning positions of the laser beam in the main scanning direction. In each of LSU, by providing the fixed mirror 106 which reflects the laser light, a position Y inside the LSU equivalent to a position X on an imaginary line is obtained, and at the position Y, the same relationship with a surface of the photosensitive drum (32Y, 32M, 32C, and 32K) of the LSU as that at the position X can be obtained. The BD sensor 105 is disposed at the position Y in each LSU.

In the LSUs 37Y, 37M, 37C, and 37K, the BD signal outputted from the BD sensor 105 is detected before the laser scans a printing valid region $P_1$–$P_2$ on each of the photosensitive drums 32Y, 32M, 32C, and 32K. After a set number of clocks of a reference clock signal for writing an image signal are counted since the detection of the BD signal, the laser light is modulated in accordance with the image signal, and starts line scanning.

Figure 7:
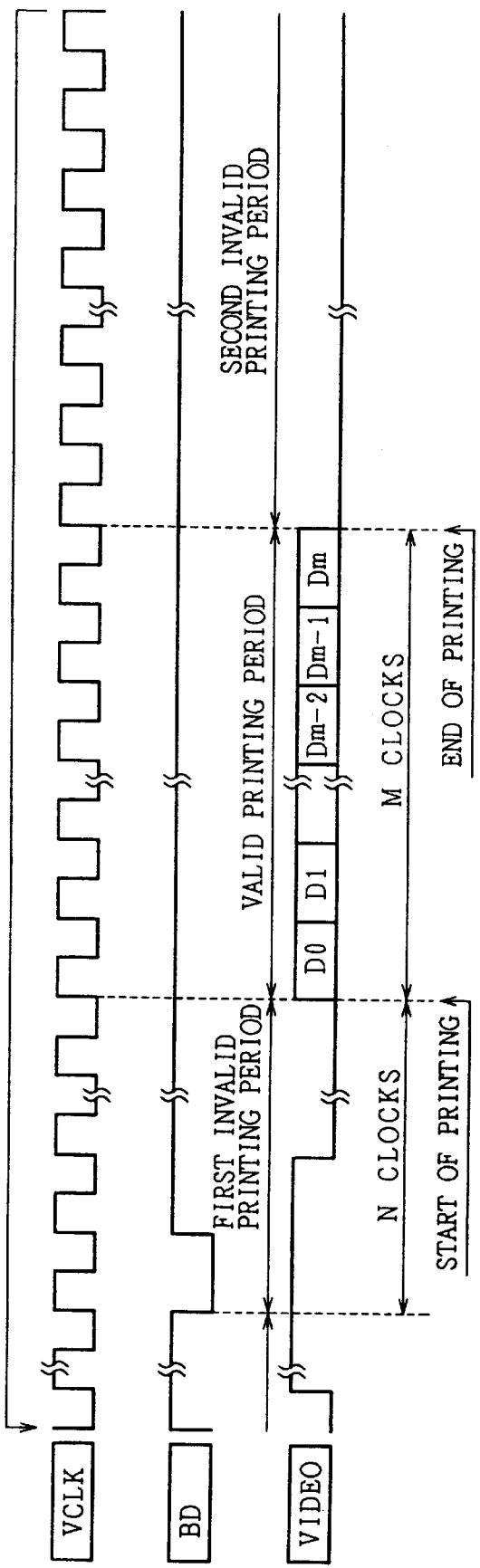
FIG. 7 is a timing chart showing a reference clock signal (denoted as VCLK in the figure), a BD signal (denoted as BD in the figure), and an image signal (denoted as VIDEO in the figure), when one line is scanned in the main scanning direction.

The reference clock signal (denoted as VCLK in the figure), the BD signal (denoted as BD in the figure), and the image signal (denoted as VIDEO in the figure) when one line is scanned in the main scanning direction are shown in a timing chart of FIG. 7.

Clocks of the reference clock signal are counted since the BD signal is detected, and when the number of the clocks counted reaches N, the image signal is outputted in synchronization with the reference clock signal. Thereafter, when the number of the clocks counted since the output of the image signal reaches M, the printing is finished. Here, the number of pixels in the main scanning direction is M.

Normally, frequencies of the respective reference signals for the LSUs 37Y, 37M, 37C, and 37K are set uniform. Therefore, with high precision in positioning the respective BD sensors in the LSUs 37Y, 37M, 37C, and 37K with respect to the photosensitive drums 32Y, 32M, 32C, and 32K, respectively, and the like, distances that the laser light travels in the main scanning direction on the photosensitive drums 32Y, 32M, 32C, and 32K during a first invalid printing period shown in FIG. 7 become equal. As a result, the scanning start positions $P_1$ (see FIG. 6) of the LSU 37Y, 37M, 37C, and 37K coincide.

As described above, however, if such precision is low, the scanning start positions tend to slightly vary due to variation of parts used and ambient conditions. In such a case, even if the printing is started immediately after the same number N of clocks are counted since the detection of the BD signal, the scanning start positions $P_1$ differ, thereby resulting in that the black toner image, the cyan toner image, the yellow toner image, and the magenta toner image are superimposed on each other with offsets.

Therefore, the digital color copying machine of the present embodiment is arranged so as to perform the following image position correcting operation: using as a reference a printing start position $P_1$ of one of the LSUs 37Y, 37M, 37C, and 37K, offsets of the printing start positions $P_1$ of the other LSUs with respect to the LSU used as reference are found, and frequencies of the reference clock signals of the LSUs other than the LSU used as reference are changed so that the offsets are cancelled.

The following description will explain an arrangement for realizing the image position correction and a process of the same in detail. Note that here shown is an example case where the LSU 37K for forming a black toner image is referred to and the other LSUs 37Y, 37M, and 37C are respectively adjusted to the reference.

First of all, the following description will explain a laser control system for performing the image position correction, provided in each of the LSUs 37Y, 37M, 37C, and 37K.

Figure 8:
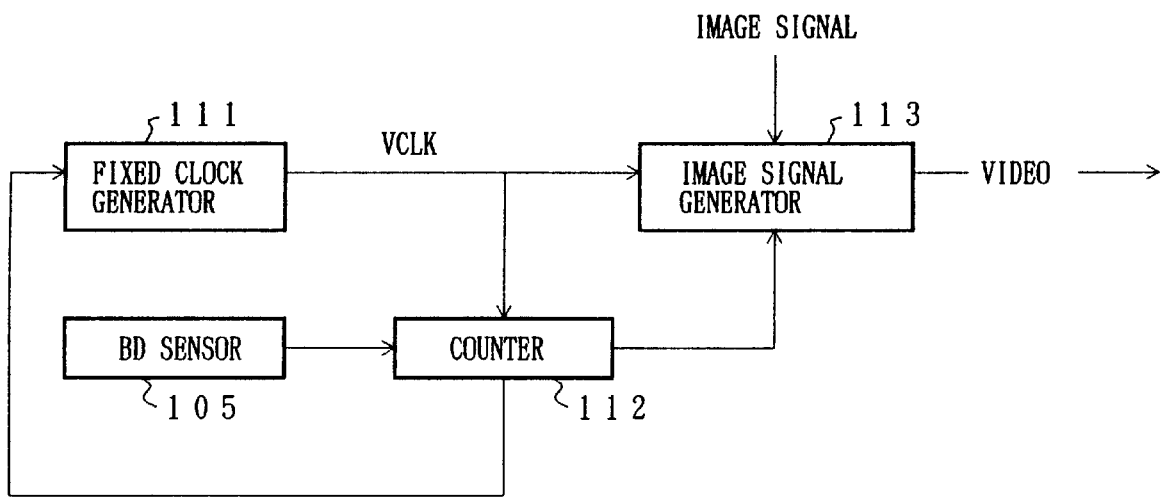
FIG. 8 is a block diagram illustrating a circuit arrangement of a laser control system in a laser beam scanner unit whose reference clock signal has a fixed frequency and which is provided in the digital color copying machine.

FIG. 8 is a block diagram of a first laser control system provided in the LSU 37K used as reference. In the first laser control system, the frequency of the reference clock signal is fixed to a predetermined value.

A fixed clock generator (reference clock signal generating means) 111 generates a reference clock signal (VCLK in the figure) which has a fixed frequency, and an output of the fixed clock generator is supplied to a counter 112 and an image signal generator 113.

The counter 112 counts clocks of the reference clock signal supplied from the fixed clock generator 111, and when the number of the clocks counted reaches a predetermined number, the counter 112 sends the information to the image signal generator (image signal generating means) 113. The BD signal is also supplied from the BD sensor 105 to the counter 112, so that the count is initialized every time one line is scanned.

An image signal, for the black color in this case, is supplied from a scanner or the like to the image signal generator 113. The image signal generator 113 outputs an image signal (VIDEO in the figure), based on the input signal from the counter 112, in synchronization with the reference clock signal supplied from the fixed clock generator 111.

Figure 9:
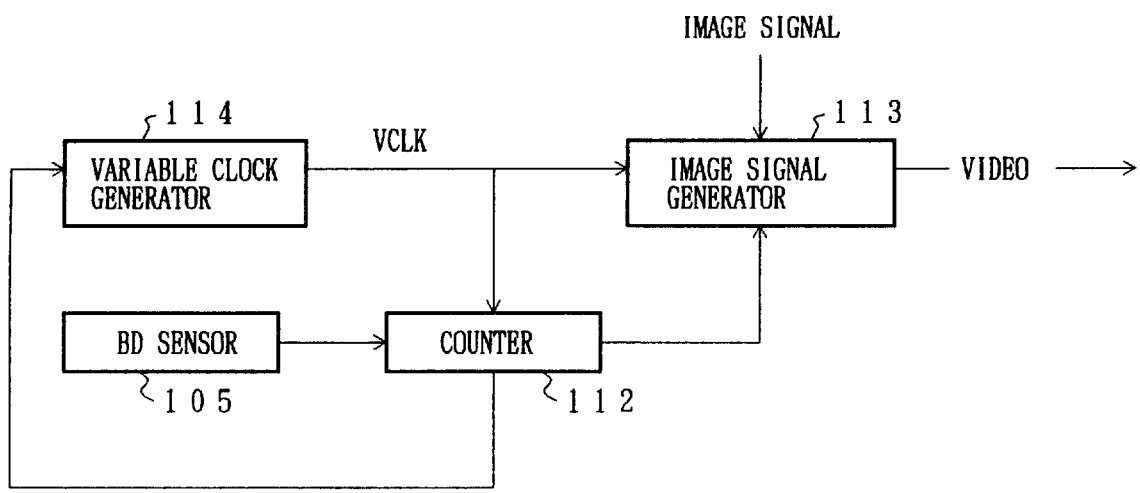
FIG. 9 is a block diagram illustrating a circuit arrangement of a laser control system in a laser beam scanner unit whose reference clock signal has a variable frequency and which is provided in the digital color copying machine.

FIG. 9 is a block diagram of a second laser control system provided in each of the LSUs 37Y, 37M, and 37C which are to be adjusted to the reference. In each second laser control system, the reference clock signal has a changeable frequency.

The second laser control system is identical to the first laser control system except that it includes a variable clock generator (reference clock signal generating means, frequency varying means) 114 for generating a reference clock signal whose frequency is variable, in lieu of the fixed clock generator 111 of the first laser control system, and that an output of the counter 112 is inputted not only to the image signal generator 113 but also to the variable clock generator 114.

During a period other than the first printing invalid period shown in FIG. 7, that is, during a valid printing period and a second invalid printing period, the variable clock generator 114 is controlled by the aforementioned PCU 44 so as to generate a fixed frequency equal to the frequency of the fixed clock signal generator 111 of the first laser control system.

On the other hand, during the first invalid printing period, the variable clock generator 114 is controlled so as to, since the detection of the BD signal, generate a frequency adjusted so that the printing start positions $P_1$ of the LSUs 37Y, 37M, and 37C coincide with the printing start position $P_1$ of the LSU 37K as reference (the first invalid printing period is hereinafter referred to as printing start adjustment period).

The variable clock generator 114 can be realized in a very simple arrangement by using a voltage control oscillator (hereinafter referred to as VCO) such as a DVO-2460A produced by Daishinku Co., Ltd. so as to change a voltage supplied to the VCO.

Figure 1:
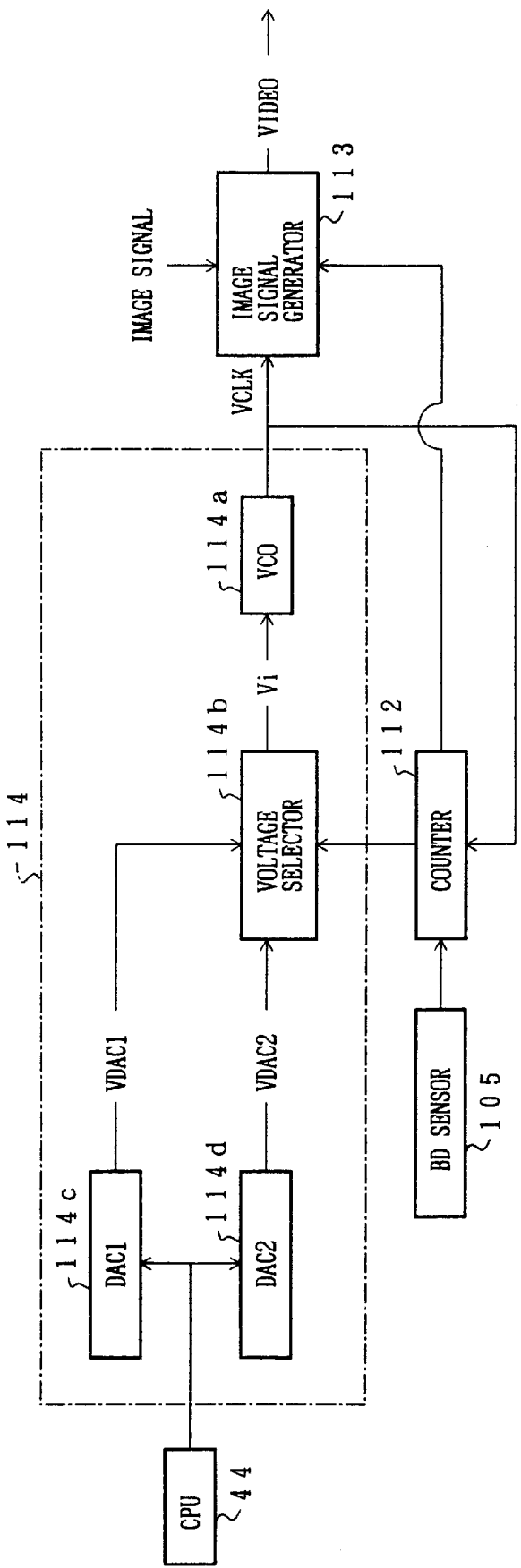
FIG. 1 is a block diagram illustrating a circuit arrangement of a laser control system in a laser beam scanner unit which is capable of varying a frequency of a reference clock signal and is provided in a digital color copying machine in accordance with an embodiment of the present invention.

FIG. 1 shows an example where the variable clock generator 114 is realized by using a VCO 114a. The variable clock generator 114 includes a first DA converter (DAC1 in the figure) 114c, a second DA converter (DAC2 in the figure) 114d, a voltage selector 114b, and a VCO 114a.

The PCU 44 sends the first DA converter 114c such a signal as to cause the VCO 114a to generate a fixed frequency, while sending the second DA converter 114d such a signal as to cause the VCO 114a to generate an adjustment frequency.

In this arrangement, let the number of clocks during the printing start adjustment period be N, and N is set in the counter 112. The counter 112 clears the count in response to detection of the BD signal by the BD sensor, and starts counting the number of clocks of the reference clock signal outputted by the VCO 114a. Here, information of the BD signal detection is sent from the counter 112 to the voltage selector 114b as well.

Until receiving information of the BD signal detection from the counter 112, the voltage selector 114b sends the VCO 114a a voltage signal Vi which is set in accordance with a voltage signal VDAC1 supplied from the first DA converter 114c, and the VCO 114a outputs the reference clock signal with the fixed frequency. When receiving the BD signal detection information, the voltage selector 114b switches the voltage signal Vi so as to be set in accordance with a voltage signal VDAC2 outputted by the second DA converter 114d. Thus, the VCO 114a outputs the reference clock signal with the adjustment frequency.

Thus, the reference clock signal whose clocks are counted by the counter 112 is the reference clock signal whose frequency is adjusted.

When the count reaches the set value N, this is informed to the voltage selector 114b by the counter 112. This causes the signal voltage Vi supplied from the voltage selector 114b to again become a voltage in accordance with the voltage signal VDAC1 supplied from the first DA converter 114c, and the VCO 114a outputs the reference clock signal with the fixed frequency.

The following description will explain a process for finding the adjustment frequency, together with a process for correcting image position.

In correcting the image position, first of all, the PCU 44 controls printer-related loads (see FIG. 4) and the like, and causes the LSUs 37Y, 37M, 37C, and 37K to form checked pattern images of yellow, magenta, cyan, and black colors extending in the sub scanning direction at the recording start position $P_1$ on the photosensitive drums 32Y, 32M, 32C, and 32K, respectively. The checked pattern images thus formed are transferred onto one sheet S.

Figure 10:
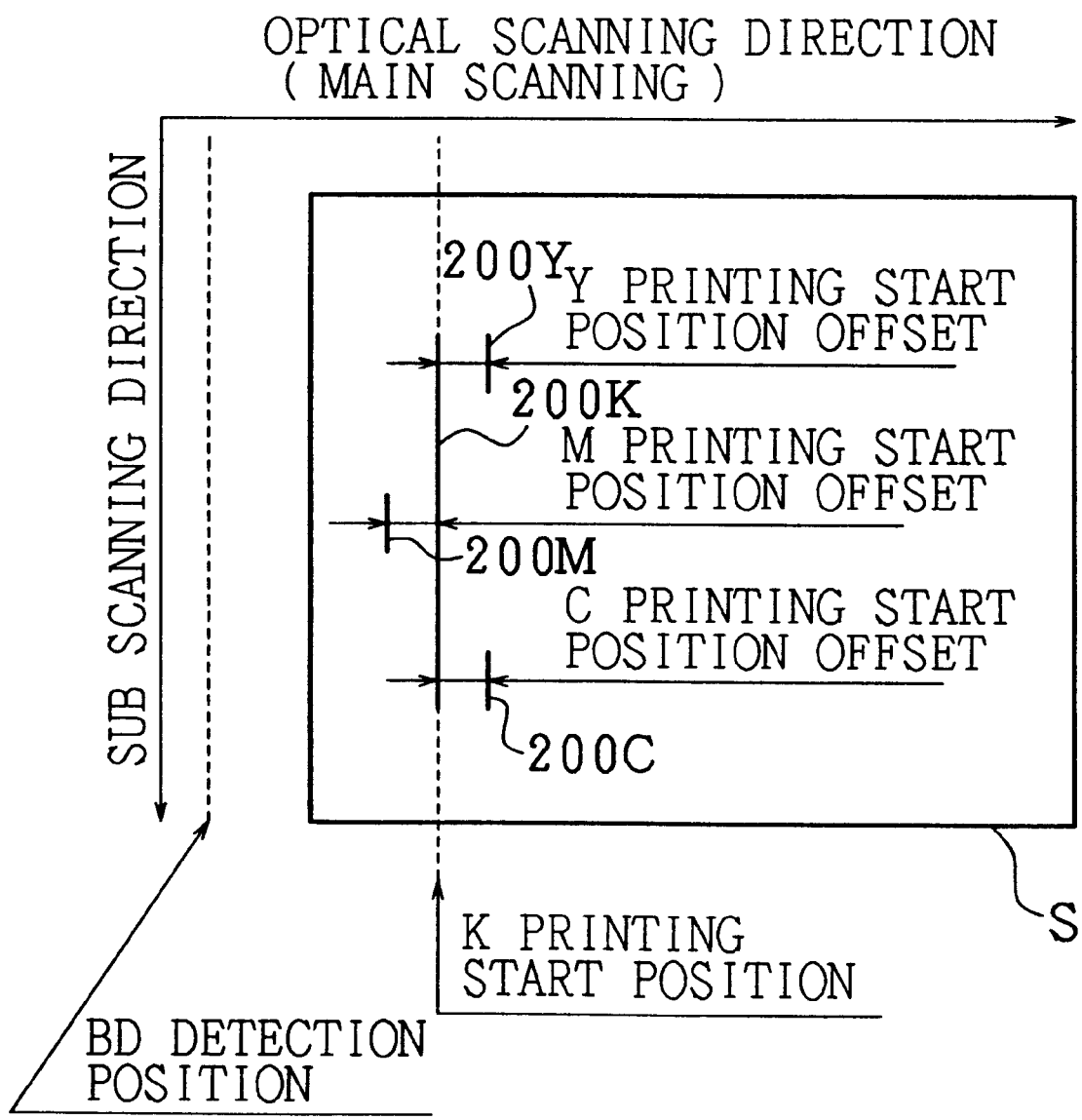
FIG. 10 is an explanatory view illustrating checked pattern images formed in an image position correcting operation.

FIG. 10 shows the sheet S on which the checked pattern images 200Y, 200M, 200C, and 200K of yellow, magenta, cyan, and black have been transferred. As clear from the figure, the black checked pattern image 200K as a reference is a pattern extending long in the sub scanning direction, whereas the yellow, magenta, and cyan checked pattern images 200Y, 200M, and 200C are short patterns which are offsetted in the sub scanning direction.

When the sheet S thus formed reaches a position of the reading sensor 99 (see FIG. 2), the reading sensor 99 reads the checked pattern images 200Y, 200M, 200C, and 200K, and the PCU 44 finds offsets of the checked pattern images 200Y, 200M, and 200C in the main scanning direction with respect to the checked pattern image 200K.

The following description will concretely explain by focusing on offset of the checked pattern image 200C with respect to the checked pattern image 200K.

Let a reading resolution of the reading sensor 99 be H [dot/m], a number of a detected pixel of the checked pattern image 200K detected by the reading sensor 99, R1, and a number of a detected pixel of the checked pattern image 200C detected by the reading sensor 99, R2 (assume that pixels of a CCD constituting the reading sensor 99 are linearly aligned in a well-ordered manner in the main scanning direction). Then, an offset (dimension) Zs at the start of printing is expressed as:

$$Zs=(|R1-R2|)/H \ [m]$$

Incidentally, in the case where a value of Zs is equal to an integer number of pixel units, only the number (set value) of clocks to be counted till the printing start position $P_1$, which is set in the counter 112, should be changed, and it is not necessary that the frequency of the reference clock signal should be variable.

However, in the case where a value of Zs is not equal to an integer number of pixel units, the offset cannot be canceled with high precision by changing the count set in the counter 112.

Therefore, to enable adjustment of a non-integer number of pixel units, or, adjustment of less than one pixel unit, Zs is converted to the number of pixels. Let the number of pixels to which Zs is converted be dc, then, dc is expressed as:

$$dc=Zs/W$$

where W is a dimension of one pixel of the present digital color copying machine. Since the number of pixels is equal to the number of clocks of the reference clock signal with the fixed frequency, an adjustment frequency fc of the reference clock signal of the LSU 37C during the printing start adjustment period is expressed as:

$$fc=(N/(N-dc))\times fk \ [Hz]$$

where N is the number of reference clocks counted since the BD signal is detected till printing of the checked pattern image 200K is started.

Since relationship between the frequency of the reference clock signal outputted from the VCO 114a and the voltage supplied to the VCO 114a is previously known, adjustment can be achieved by supplying the voltage signal Vi to the VCO 114a of the laser control system provided in the LSU 37C so that the foregoing frequency is obtained.

Incidentally, dc indicative of the offset (dimension) Zs converted to the number of clocks of the reference clock signal with the set frequency can be also expressed as:

$$dc = Tdc \times fk$$

where Tdc is an offset time.

With adjusting means which uses such variation of frequency of the reference clock signal, the printing start position $P_1$ of the LSU 37C and the printing start position $P_1$ of the LSU 37K can be made to coincide with each other by carrying out adjustment of less than one pixel unit thereby eliminating the offset therebetween.

Figure 11:
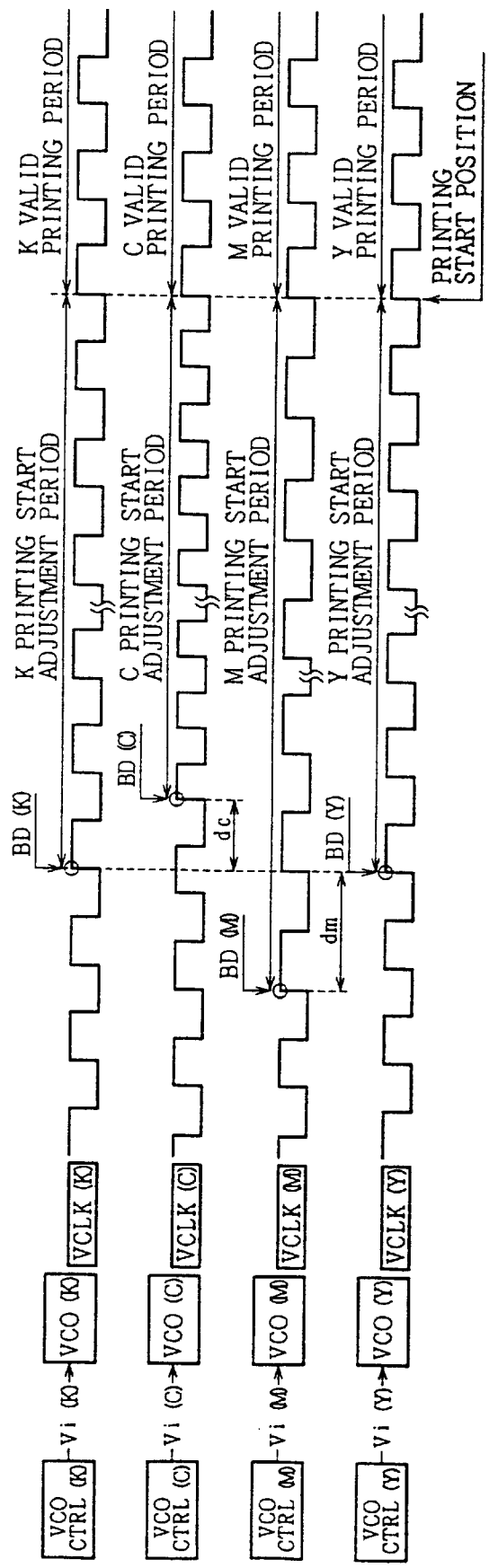
FIG. 11 is an explanatory view illustrating waveforms of reference clock signals of the laser beam scanner units for black, cyan, yellow, and magenta in the image position correcting operation, which explicitly shows correspondence of the waveforms to positions in the main scanning direction of the laser light.

FIG. 11 illustrates respective waveforms of the reference clocks signals of the LSUs 37Y, 37M, 37C, and 37K subject to the aforementioned image position correcting operation, with correspondence thereof to positions in the main scanning direction. Points denoted as BD(Y), BD(M), BD(C), and BD(K) are the BD signal detection positions of the LSUs 37Y, 37M, 37C, and 37K, respectively. During the printing start adjustment period, the respective reference clock signals VCLK(Y), VCLK(M), and VCLK(C) of the LSUs 37Y, 37M, and 37C are oscillated so as to have adjustment frequencies suitable for eliminating offsets of the printing start positions $P_1$.

In such an image position correcting operation, an offset in the main scanning direction between the LSU 37K and the LSU 37C is detected as described above, and the reference clock signal of the LSU 37C is adjusted during the printing start adjustment period so that the offset of images of the both can be eliminated. Thereafter, sequentially, an offset between the LSU 37K and the LSU 37M, and an offset between the LSU 37K and the LSU 37Y are eliminated in the same manner. The order, however, is not specifically limited to this.

By so doing, in the color mode, offsets in the main scanning direction of the printing start positions $P_1$ of the black, cyan, yellow, and magenta images can be eliminated, whereby an excellent color image can be obtained.

Further, as shown in FIG. 11, in the image position correcting operation, all the reference clock signals of the LSUs 37Y, 37M, 37C, and 37K have a fixed frequency during the valid printing period, and images are written in synchronization with the reference clock signals.

In the case where the LSUs 37Y, 37M, 37C, and 37K are arranged so as to write image signals in synchronization with the reference clock signals with the offset-cancellation-use adjustment frequencies even during the valid printing period ensuing to the printing start adjustment period, images of the respective colors are written at different print pitches during the valid printing period, thereby resulting in deterioration of image quality. On the other hand, with the aforementioned arrangement, the print intervals during the valid printing period are uniform regarding all the color images, thereby resulting in that high image quality can be obtained.

Figure 12:
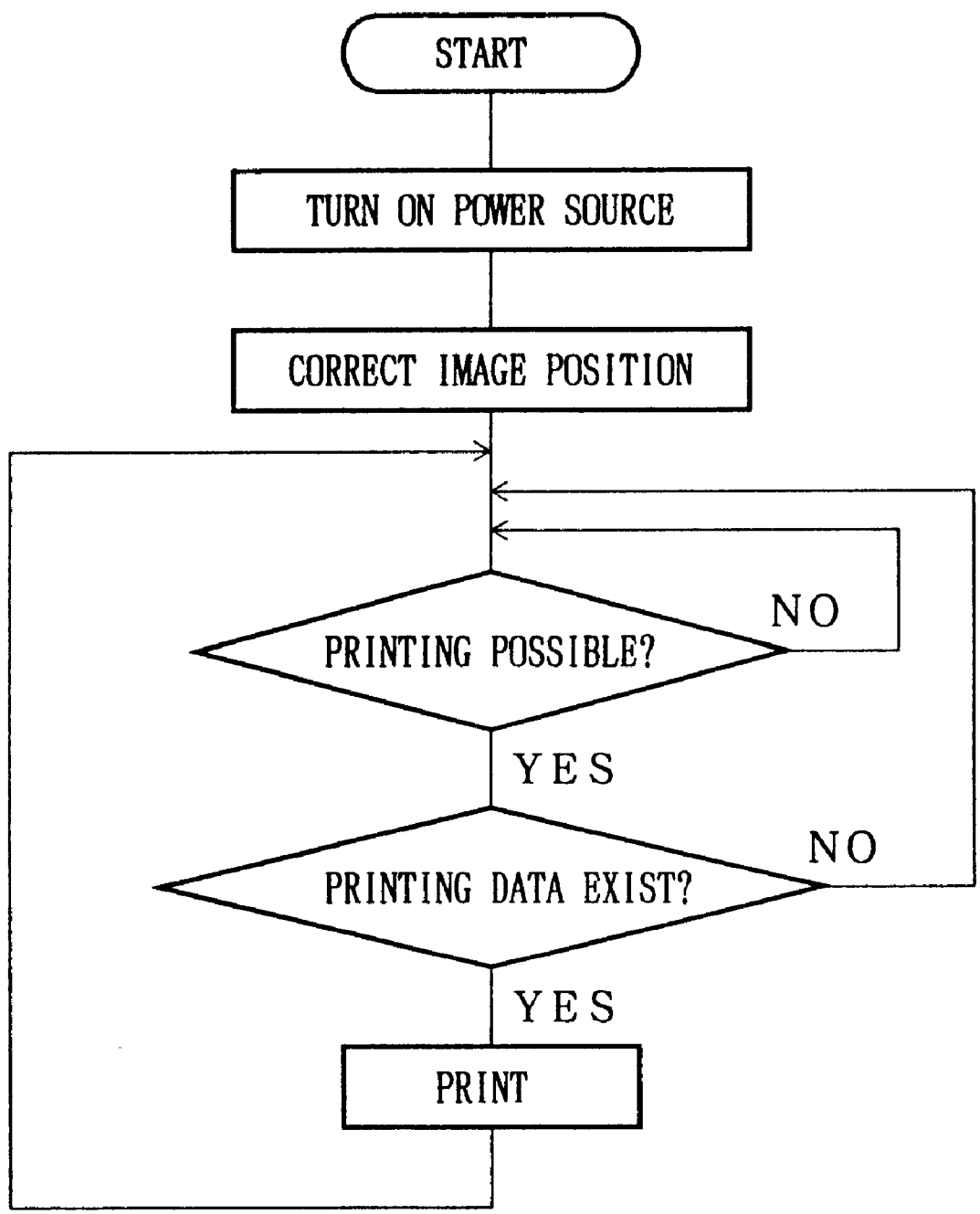
FIG. 12 is a flowchart showing a timing for carrying out the image position correcting operation.
Figure 13:
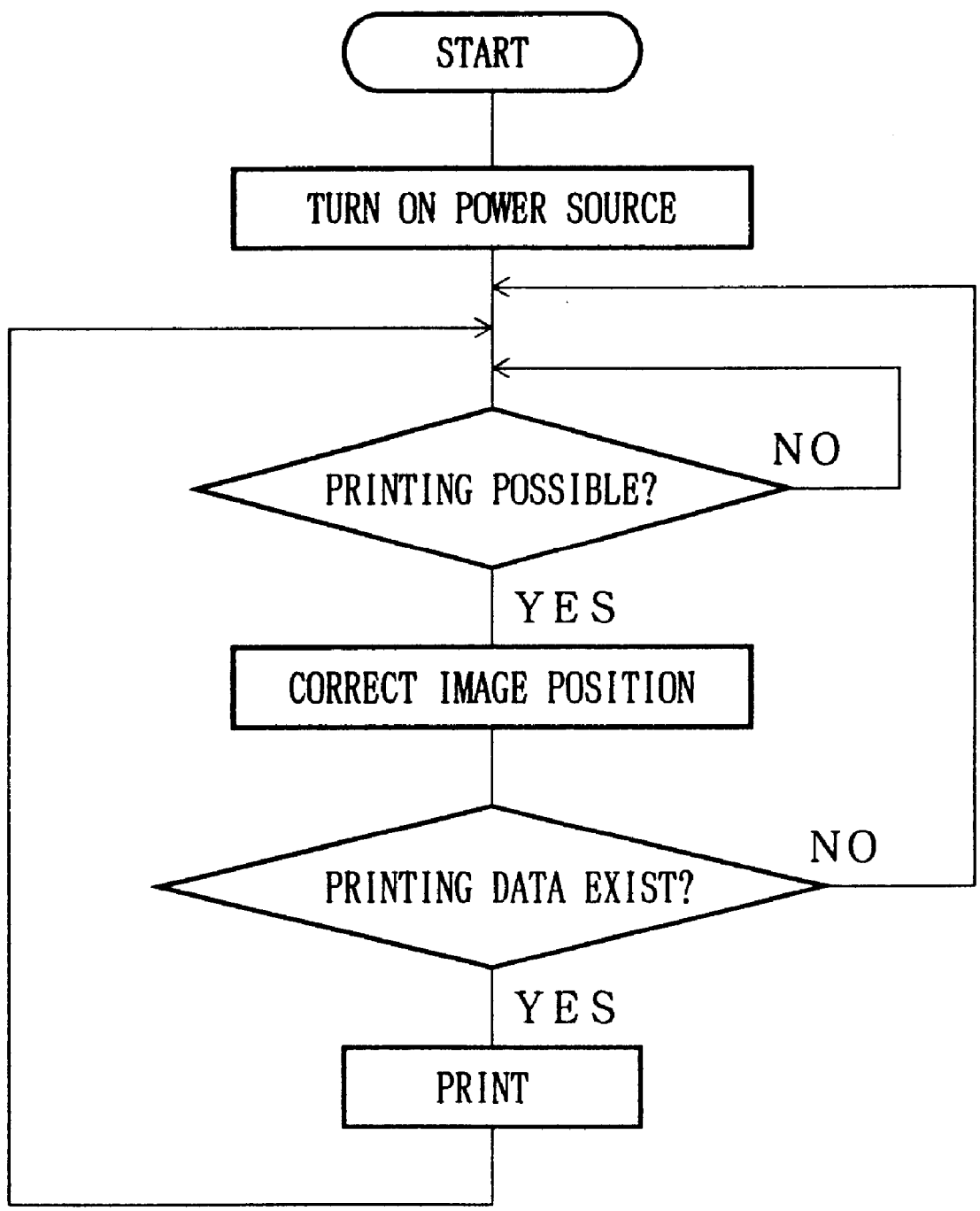
FIG. 13 is a flowchart showing another timing for carrying out the image position correcting operation.
Figure 14:
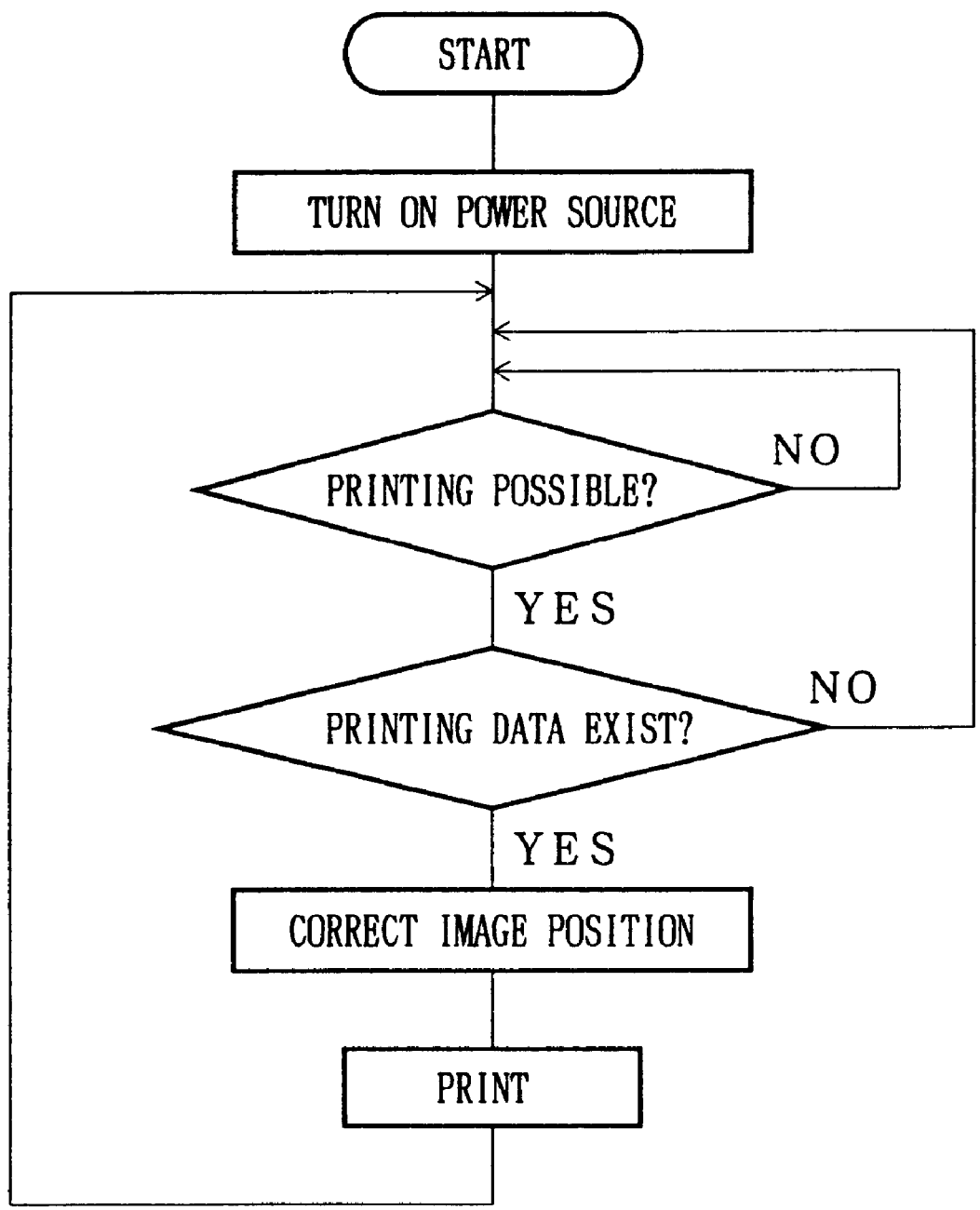
FIG. 14 is a flowchart showing still another timing for carrying out the image position correcting operation.

The image position correction may be performed at any one of timings shown in the flowcharts of FIGS. 12, 13, and 14.

FIG. 12 shows a process wherein the image position correction is carried out when a power source is turned on. Generally, when the power source is turned on, it takes more or less, for example, for a fixing heater to have a temperature rise and become stabilized in the case of an electrophotographic system, or for an initial aging to be performed so that an image forming device becomes ready for printing. By carrying out the aforementioned image position correction during this period, to spend extra time for the image position correction can be avoided.

Furthermore, since the adjustment is performed only once when the power source is turned on, the number of the adjusting operation is minimized, and wasteful usage of time is avoided.

In other words, since the image position correcting operation is performed when the power source is turned on, the time till the main body becomes ready is not wasted, and excellent images without image offset can be obtained.

FIG. 13 illustrates a process wherein the image position correcting operation is every time the optical scanning recording operation is ready, that is, every time the device becomes ready for printing. Various factors such as irregularities of mechanical parts, thermal expansion due to variation of temperature around the device, displacement of parts due to vibration, and the like can be considered as factors causing image offset, and it is difficult to predict when the device incurs such factors.

Therefore, by conducting the image position correcting operation every time the device becomes ready for the optical scanning recording, whenever images are outputted, excellent images can be obtained without image offset.

FIG. 14 shows a process wherein the image position correcting operation is performed immediately before the start of printing. In the process, the number of adjusting operations is greater than that in the case where the operation is performed at timings shown in FIG. 12 or 13, but the finest adjustment can be performed.

In the present digital color copying machine, the LSUs 37Y, 37M, and 37C are adjusted by referring to the LSU 37K, but in the case of an arrangement wherein black toner is not used in the color mode, there is no need to eliminate an image offset between a monochromatic output image and a color output image in the main scanning direction, and therefore, one among the LSUs 37Y, 37M, and 37C for forming color images may be used as reference when adjustment is performed. Furthermore, the LSU to be referred to does not need to be limited to one, but one LSU may be adjusted referring to another LSU, and the still another LSU may be adjusted referring to the foregoing former LSU.

In the case where the black toner is used in the color mode, however, it is preferable that the LSU 37K for black color should be used as reference, like in the present digital color copying machine. This is because the LSU 37K is suitable for being referred to, for the following reason: since the output level of the reading sensor 99 when reading the checked pattern image of the black color is greater than that for any one of the cyan, yellow, and magenta colors, and the LSU 37K is easily controlled.

Considering the position relationship with respect to the transfer transporting belt 26 (see FIG. 2), it is preferable to refer to the LSU positioned on the most upstream side in the transport direction of the transfer transporting belt 26 (the sub scanning direction) (i.e., the position of the LSU 37K in the case of FIG. 2). This is because the aforementioned position is closest to the driving roller 24 and therefore is least likely to be adversely affected by, for example, the winding of the transfer transporting belt 26.

Incidentally, the checked pattern images to be formed do not have to be limited to the vertical line-like checked pattern images 200Y, 200M, 200C, and 200K shown in FIG. 10, but any images suitable for the system for detecting offset may be applicable. Besides, here, the offsets of the images in the main scanning direction are read by the reading sensor 99, but any other various methods may be applicable: for example, the operator him/herself may calculate offsets by using the sheet S on which the checked pattern images are formed, and input the calculation result to the device.

[Second Embodiment]

Figure 15:
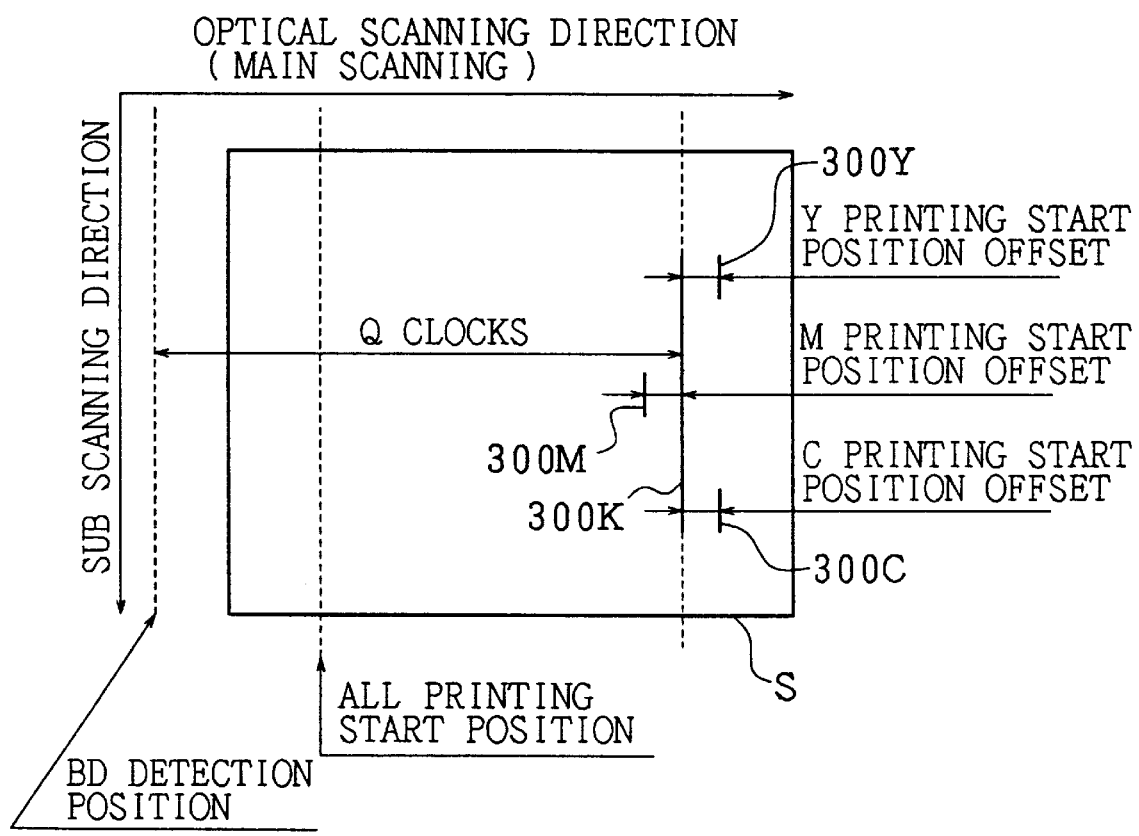
FIG. 15 is an explanatory view illustrating checked pattern images formed in an image position correcting operation by a digital color copying machine in accordance with another embodiment of the present invention.
Figure 16:
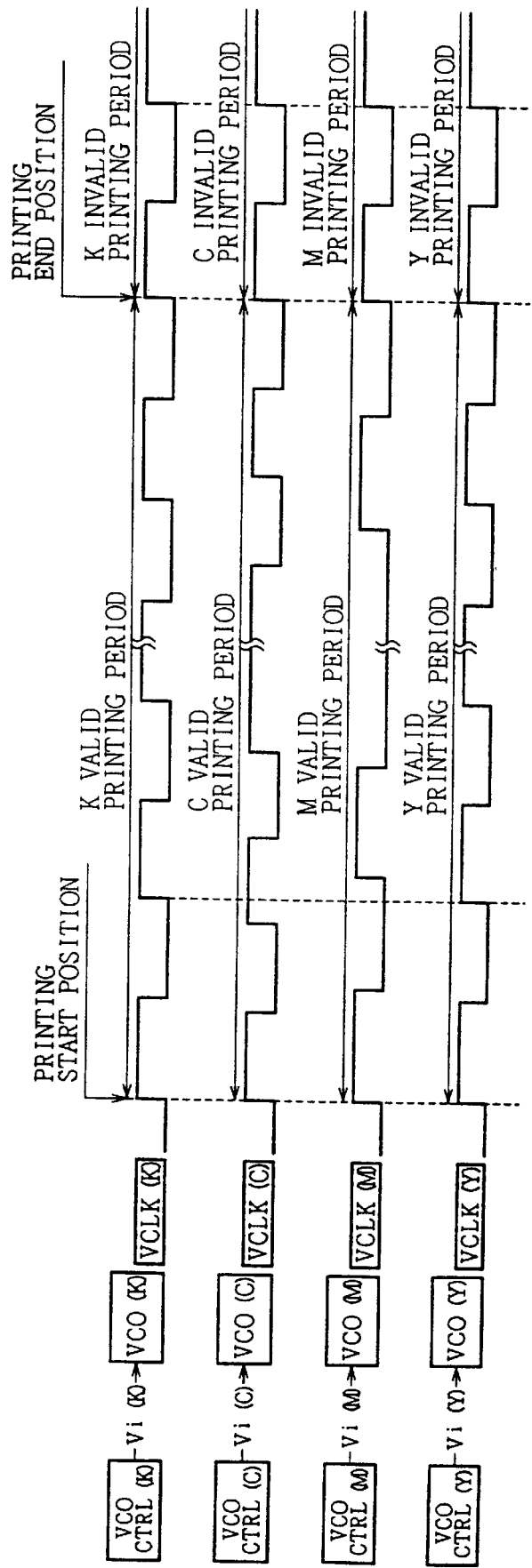
FIG. 16 is an explanatory view illustrating waveforms of reference clock signals of the laser beam scanner units for black, cyan, yellow, and magenta in the image position correcting operation, which explicitly shows correspondence of the waveforms to positions in the main scanning direction of the laser light.

The following description will explain the second embodiment of the present invention, while referring to FIGS. 15 and 16. The members having the same structure (function) as those in the above-mentioned embodiment will be designated by the same reference numerals and their description will be omitted.

A digital color copying machine in accordance with the present embodiment is arranged as follows. To start with, the printing start positions $P_1$ of the LSUs 37Y, 37M, 37C, and 37K are adjusted in the same manner as that for the digital color copying machine of the first embodiment, and subsequently, offsets of printing end positions $P_2$ (see FIG. 6) are detected. By adjusting the frequencies of the reference clock signals during the valid printing period according to the offsets of the printing end positions $P_2$, differences of print intervals are eliminated.

The following description will explain the image position correcting operation.

First of all, as explained in the description of the first embodiment, checked pattern images are formed by using the LSUs 37Y, 37M, 37C, and 37K, and the printing start positions $P_1$ are adjusted so that offsets of the printing start positions are eliminated.

Next, checked pattern images of yellow, magenta, cyan, and black which extend in the sub scanning direction are formed at the printing end positions $P_2$ by using the LSUs 37Y, 37M, 37C, and 37K, respectively, and are transferred onto the sheet S. FIG. 15 shows the sheet S on which the checked pattern images 300Y, 300M, 300C, and 300K of yellow, magenta, cyan, and black have been transferred.

When the sheet S reaches the position of the reading sensor 99 (see FIG. 2), the reading sensor 99 reads the checked pattern images 300Y, 300M, 300C, and 300K, and the PCU 44 found offsets of the printing end positions $P_2$ of the checked pattern images 300Y, 300M, and 300C with respect to that of the checked pattern image 300K in the main scanning direction.

The following description will concretely explain offsets of the checked pattern image 300C with respect to the checked pattern image 300K.

Let a reading resolution of the reading sensor 99 be H [doc/m], a number of a detected pixel of the checked pattern image 300K detected by the reading sensor, R3, and a number of a detected pixel of the checked pattern image 300C detected by the reading sensor, R4 (assume that pixels of a CCD constituting the reading sensor 99 are linearly aligned in a well-ordered manner in the main scanning direction). Then, an offset (dimension) Ze at the end of printing is expressed as:

$$Ze=(|R3-R41|)/H\ [m]$$

Let the number of pixels to which Ze is converted be dce, then, dce is expressed as:

$$dce=Zs/W$$

where W is a dimension of one pixel of the present digital color copying machine. Since the number of pixels is equal to the number of clocks of the reference clock signal with the fixed frequency, an adjustment frequency fce of the reference clock signal of the LSU 37C during the valid printing period is expressed as:

$$fce=(Q/(Q-dce))\times fk\ [Hz]$$

Since relationship between the frequency of the reference clock signal outputted from the VCO 114*a* and the voltage supplied to the VCO 114*a* is previously known, adjustment can be achieved by supplying the voltage signal Vi to the VCO 114*a* of the laser control system provided in the LSU 37C so that the foregoing frequency is obtained.

FIG. 16 illustrates respective waveforms of the reference clocks signals of the LSUs 37Y, 37M, 37C, and 37K subject to the aforementioned image position correcting operation, with correspondence thereof to positions in the main scanning direction. During the valid printing period, the respective reference clock signals VCLK(Y), VCLK(M), and VCLK(C) of the LSUs 37Y, 37M, and 37C are oscillated so as to have adjustment frequencies suitable for correcting differences of print intervals thereof.

In such an image position correcting operation, not only offsets in the main scanning direction of the printing start positions $P_1$ due to errors occurring in fixing the BD sensors 105 in the LSUs 37Y, 37M, 37C, and 37K, but also differences of print intervals due to positional errors between the LSUs 37Y, 37M, 37C, and 37K and the photosensitive drums 32Y, 32M, 32C, and 32K can be corrected by changing the frequencies of the reference clocks. As a result, more excellent images can be obtained.

The image forming device of the present invention may be arranged so that each of the plurality of the image optical scanning recording section is equipped with the frequency varying means.

With the foregoing arrangement, the image optical scanning recording section to be referred to is freely selected when necessary. Even in the case where, for example, frequency varying means of one image optical scanning recording section is broken down thereby to generate only the reference clock signal with the fixed frequency, the frequencies of the reference clocks signals of the other image optical scanning recording section, if their frequency varying means normally work, may be adjusted to the clock signal of the broken image optical scanning recording section so that offsets are eliminated. Thus, the images of the image optical scanning recording section can have right position relationship each other.

The image forming device of the present invention can be arranged as follows: (1) the image signal is composed of color image signals resulting on color decomposition; (2) the plurality of image optical scanning recording sections correspond to the color image signals, respectively; and (3) pairs of the image optical scanning recording sections are formed, and the control means controls the reference clock signals so that in each pair, a reference clock signal of one image optical scanning recording section is adjusted by referring to a reference clock signal of the other image optical scanning recording section.

In the aforementioned color image forming device, for example, four image optical scanning recording sections corresponding to four colors of black, cyan, yellow, and magenta are divided into two pairs, and in each pair, one is adjusted by referring to the other so that images have right position relationship each other. By using two of the image optical scanning recording sections as references, time required for correction can be shortened as long as the image optical scanning recording sections used as references do not have an offset with respect to each other.

Furthermore, in the case where pairs are formed in the plurality of the image optical scanning recording sections, it is preferable that one positioned on the upstream side and one positioned on the downstream side should be paired and that on the upstream side should be used as reference in each pair. This is because the image optical scanning recording section on the upstream side among those linearly provided in the transfer material proceeding direction is close to the driving roller 24 and therefore is considered to be least affected by the winding of the transfer transporting belt 26, thereby allowing more accurate correction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming device comprising a plurality of image optical scanning recording sections, each image optical scanning recording section starting image recording by line scanning in accordance with an image signal when the number of clocks of a reference clock signal counted in synchronization with a line scanning synchronizing signal reaches a predetermined number, wherein:

at least one of said image optical scanning recording sections has frequency varying means for varying a frequency of the reference clock signal thereof, said image forming device further comprising:

control means for controlling said frequency varying means so as to adjust the frequency of the reference clock signal based on an offset of an image recording start position of said image optical scanning recording section in a main scanning direction crossing a proceeding direction of a transfer material so that the image recording start position coincides with an image recording start position of the other image optical scanning recording section; and wherein:

the image signal is composed of color image signals resulting on color decomposition;

the plurality of said image optical scanning recording sections correspond to the color image signals, respectively, and pairs of said image optical scanning recording sections are formed, and said control means controls the reference clock signals so that in each pair, a reference clock signal of one image optical scanning recording section is adjusted by referring to a reference clock signal of the other image scanning recording section.

2. The image forming device as set forth in claim 1, wherein said control means adjusts the frequency of the reference clock signal based on the offset of the image recording start position in the main scanning direction until the predetermined number of clocks of the reference clock signal are counted, and suspends the adjustment of the frequency after the predetermined number of clocks of the reference clock signal are counted, so as to cause the reference clock signal to have a predetermined frequency.

3. The image forming device as set forth in claim 2, further comprising:

checked pattern forming means for causing said image optical scanning recording sections to form checked patterns, respectively, in accordance with a same reference clock signal; and an operational section with which an operator inputs an offset in the main scanning direction between positions of the checked patterns.

4. The image forming device as set forth in claim 1, wherein said control means adjusts the frequency of the reference clock signal based on the offset of the image recording start position in the main scanning direction, and adjusts the frequency of the reference clock signal during a valid image recording period based on an offset of an image recording end position.

5. The image forming device as set forth in claim 4, further comprising:

checked pattern forming means for causing said image optical scanning recording sections to form checked patterns, respectively, in accordance with a same reference clock signal; and an operational section with which an operator inputs an offset in the main scanning direction between positions of the checked patterns.

6. The image forming device as set forth in claim 1, wherein said frequency varying means is provided in each of all said image optical scanning recording sections except said image optical scanning recording section used as reference.

7. The image forming device as set forth in claim 1, wherein said frequency varying means includes a voltage control oscillator which varies a frequency of an oscillated signal in accordance with a voltage applied thereto.

8. The image forming device as set forth in claim 7, wherein:

said frequency varying means further includes:

a first DA converter for setting a voltage signal corresponding to a reference clock signal with a fixed frequency;

a second DA converter for setting a voltage signal corresponding to a reference clock signal with an adjusted frequency; and a voltage selector, wherein said voltage selector selects one from the voltage signals of the first and second DA converters in accordance with the line scanning synchronizing signal, and supplies the voltage signal thus selected to said voltage control oscillator, so that the frequency of the reference clock signal outputted by said voltage control oscillator is adjusted.

9. The image forming device as set forth in claim 1, wherein said control means adjusts the frequency of the reference clock signal in a manner such that a recording position can be adjusted by non-integer times a pixel unit, that is, by less than one pixel unit.

10. The image forming device as set forth in claim 1, further comprising:

offset detecting means for detecting the offset of the image recording position in the main scanning direction; and checked pattern forming means for causing said image optical scanning recording sections to form checked patterns, respectively, in accordance with a same reference clock signal, wherein said control means adjusts the frequency of the reference clock signal in accordance with the offset of the image recording position in the main scanning direction, the offset thus detected by said offset detecting means.

11. The image forming device as set forth in claim 1, wherein:

the image signal is composed of color image signals resulting on color decomposition;

said plurality of image optical scanning recording sections correspond to the color image signals, respectively; and said control means adjusts the reference clock signals of said image optical scanning recording sections by referring to the reference clock signal of one of said image optical scanning recording sections.

12. The image forming device as set forth in claim 8, wherein one of said plurality of image optical scanning recording sections corresponds to a black color image signal, and said control means adjusts the reference clock signals of said image optical scanning recording sections by referring to the clock signal of said one of said plurality of image optical scanning recording sections corresponding to the color black as a reference.

13. The image forming device as set forth in claim 12, further comprising:

offset detecting means for detecting the offset of the image recording position in the main scanning direction; and checked pattern forming means for causing said image optical scanning recording section used as reference to form a first checked pattern, while causing the other image optical scanning recording section to form a second checked pattern so that the second checked pattern is offsetted in a sub scanning direction crossing the main scanning direction, wherein said control means adjusts the frequency of the reference clock signal of said image optical scanning recording section not used as reference, in accordance with the offset of the image recording position of the second checked pattern with respect to that of the first checked pattern detected by said offset detecting means.

14. The image forming device as set forth in claim 11, wherein said image optical scanning recording section used as reference is positioned on the most upstream side of the transfer material proceeding direction, among said image optical scanning recording sections juxtaposed in the transfer material proceeding direction.

15. The image forming device as set forth in claim 14, further comprising:

offset detecting means for detecting the offset of the image recording position in the main scanning direction; and checked pattern forming means for causing said image optical scanning recording section used as reference to form a first checked pattern, while causing the other image optical scanning recording section to form a second checked pattern so that the second checked pattern is offsetted in a sub scanning direction crossing the main scanning direction, wherein said control means adjusts the frequency of the reference clock signal of said image optical scanning recording section not used as reference, in accordance with the offset of the image recording position of the second checked pattern with respect to that of the first checked pattern detected by said offset detecting means.

16. The image forming device as set forth in claim 11, further comprising:

offset detecting means for detecting the offset of the image recording position in the main scanning direction; and checked pattern forming means for causing said image optical scanning recording section used as reference to form a first checked pattern, while causing the other image optical scanning recording section to form a second checked pattern so that the second checked pattern is offsetted in a sub scanning direction crossing the main scanning direction, wherein said control means adjusts the frequency of the reference clock signal of said image optical scanning recording section not used as reference, in accordance with the offset of the image recording position of the second checked pattern with respect to that of the first checked pattern detected by said offset detecting means.

17. The image forming device as set forth in claim 1, further comprising:

offset detecting means for detecting the offset of the image recording position in the main scanning direction; and checked pattern forming means for causing said image optical scanning recording section referred to by said control means to form a first checked pattern, while causing the other image optical recording section to form a second checked pattern so that the second checked pattern is offsetted in a sub scanning direction crossing the main scanning direction, wherein said control means adjusts the frequency of the reference clock signal of said image optical scanning recording section that is not referred to by said control means to form said first checked pattern, in accordance with the offset of the image recording position of the second checked pattern with respect to that of the first checked pattern detected by said offset detecting means.

18. The image forming device as set forth in claim 7, wherein among said image optical scanning recording sections juxtaposed in the transfer material proceeding direction, pairs are formed so that regarding each pair, one positioned on the upstream side and one positioned on the downstream side are paired and a reference clock signal of one image optical scanning recording section positioned on the downstream side is adjusted by referring to a reference clock signal of the image optical scanning recording section on the upstream side.

19. The image forming device as set forth in claim 1, wherein the adjustment of the frequency of the reference clock signal by said control means is conducted every time a power source of said image forming device is turned on.

20. The image forming device as set forth in claim 1, wherein the adjustment of the frequency of the reference clock signal by said control means is conducted every time each image optical scanning recording section becomes capable of optical scanning with respect to each line in response to the image signal.

21. The image forming device as set forth in claim 1, wherein the adjustment of the frequency of the reference clock signal by said control means is conducted immediately before a printing operation of said image forming device.

22. The image forming device as set forth in claim 1, further comprising:

checked pattern forming means for causing said image optical scanning recording sections to form checked patterns, respectively, in accordance with a same reference clock signal; and an operational section with which an operator inputs an offset in the main scanning direction between positions of the checked patterns.

23. The image forming device as set forth in claim 1, wherein said frequency varying means is provided in every image optical scanning recording section.

24. An image forming device comprising:

a plurality of image optical scanning recording sections, each image optical scanning recording section including:

reference clock signal generating means for generating a reference clock signal;

image signal generating means for generating an image signal in accordance with the reference clock signal; and synchronizing signal generating means for generating a line scanning synchronizing signal for synchronization of line scanning with respect to each line, so that each image optical scanning recording section starts image recording by line scanning in accordance with the image signal when the number of clocks of the reference clock signal counted since generation of the line scanning synchronizing signal reaches a predetermined value, wherein:

reference clock signal generating means of at least one among said image optical scanning recording sections has frequency varying means for freely adjusting the frequency of the reference clock signal, said image forming device further comprising:

control means for, by using said frequency varying means, adjusting the frequency of the reference clock signal so that an offset of an image recording start position of said image optical scanning recording section having said frequency varying means with respect to an image recording start position of the other image optical scanning recording section is eliminated; and wherein:

the image signal is composed of color image signals resulting on color decomposition;

the plurality of said image optical scanning recording sections correspond to the color image signals, respectively, and pairs of said image optical scanning recording sections are formed, and said control means controls the reference clock signals so that in each pair, a reference clock signal of one image optical scanning recording section is adjusted by referring to a reference clock signal of the other image scanning recording section.

\* \* \* \* \*